(12) United States Patent
Bertocchi

(10) Patent No.: US 10,092,029 B2
(45) Date of Patent: Oct. 9, 2018

(54) CRUSHING MACHINE FOR A FOOD PRODUCT THAT IS FROZEN IN BLOCKS, OR IN IQF FORM, AND PLANT COMPRISING SUCH A MACHINE FOR MAKING PUREE, OR JUICE, FROM A FOOD PRODUCT

(71) Applicant: Alessandro Bertocchi, Parma (IT)

(72) Inventor: Alessandro Bertocchi, Parma (IT)

( * ) Notice: Subject to any disclaimer, the term of this patent is extended or adjusted under 35 U.S.C. 154(b) by 182 days.

(21) Appl. No.: 15/102,945

(22) PCT Filed: Dec. 23, 2014

(86) PCT No.: PCT/IB2014/067284
§ 371 (c)(1),
(2) Date: Jun. 9, 2016

(87) PCT Pub. No.: WO2015/097673
PCT Pub. Date: Jul. 2, 2015

(65) Prior Publication Data
US 2016/0374385 A1    Dec. 29, 2016

(30) Foreign Application Priority Data

Dec. 24, 2013 (IT) .................. PI2013A0105

(51) Int. Cl.
| | |
|---|---|
| *A23N 1/02* | (2006.01) |
| *A23L 19/00* | (2016.01) |
| *A23L 2/04* | (2006.01) |
| *B02C 18/20* | (2006.01) |
| *B02C 18/22* | (2006.01) |
| *F25C 5/04* | (2006.01) |

(52) U.S. Cl.
CPC .................. *A23N 1/02* (2013.01); *A23L 2/04* (2013.01); *A23L 19/09* (2016.08); *B02C 18/20* (2013.01); *B02C 18/2216* (2013.01); *F25C 5/046* (2013.01)

(58) Field of Classification Search
CPC .. A23N 1/02; A23L 2/04; A23L 19/09; A22C 17/0026; B02C 4/08; B02C 4/30; B02C 4/32; B02C 18/28
(Continued)

(56) References Cited

U.S. PATENT DOCUMENTS 3,799,460 A * 3/1974 Medelberg ............. B22D 31/00
209/673
3,933,086 A * 1/1976 Standing ................ A23N 15/06
222/272

(Continued)

FOREIGN PATENT DOCUMENTS

| DE | 3543902 | * 5/1987 | ............. B02C 18/28 |
|---|---|---|---|
| EP | 0 511 174 A1 | 10/1992 | |

(Continued)

OTHER PUBLICATIONS

International Search Report dated Sep. 28, 2015 for International Application No. PCT/IB2014/067284.
Espacenet English abstract of FR 2127299 A5.

*Primary Examiner* — Reginald L Alexander
(74) *Attorney, Agent, or Firm* — Ladas & Parry LLP; Malcolm J. MacDonald

(57) ABSTRACT

A crushing machine for a vegetable food product frozen in blocks, or in IQF form. The machine includes a box-like body containing defining a crushing chamber. The box-like body has an inlet port, through which the frozen food product is put in the crushing chamber and an outlet port through which a frozen crushed product is discharged from the crushing chamber. In the crushing chamber a crushing unit is mounted comprising a plurality of crushing rollers, for example three crushing rollers. Each crushing roller is arranged to rotate about a respective rotation axis and is having peripherally a plurality of teeth arranged to cut the frozen product into blocks, or IQF form, for splitting it into (Continued)

the above described fragments of predetermined size. In particular, the rotation axes of the crushing rollers are parallel to each other.

17 Claims, 16 Drawing Sheets

(58) Field of Classification Search
USPC .......... 99/510, 513, 625, 628; 241/222, 141, 241/159, 157, 227, 226, 235, 236, 260, 241/245, 251, 165.5, 293
See application file for complete search history.

(56) References Cited

U.S. PATENT DOCUMENTS

| | | |
|---|---|---|
| 4,643,085 A | 2/1987 | Bertocchi |
| 5,970,582 A * | 10/1999 | Stover ................. D01B 1/02 19/24 |
| 6,311,908 B1 * | 11/2001 | Kajiyama ............... B02C 18/14 241/159 |
| 2010/0001110 A1 * | 1/2010 | Tschantz ................ B02C 13/20 241/165.5 |
| 2013/0020422 A1 * | 1/2013 | Bynelius ............. B02C 18/2291 241/28 |

FOREIGN PATENT DOCUMENTS

| | | |
|---|---|---|
| FR | 2127299 A5 | 10/1972 |
| IT | 1199392 B | 12/1988 |
| IT | 1249363 B | 2/1995 |
| WO | 93/09684 A1 | 5/1993 |
| WO | 03/034843 A1 | 5/2003 |
| WO | 2009/063309 A2 | 5/2009 |
| WO | 2010/103376 A2 | 9/2010 |
| WO | 2013105016 A2 | 7/2013 |

* cited by examiner

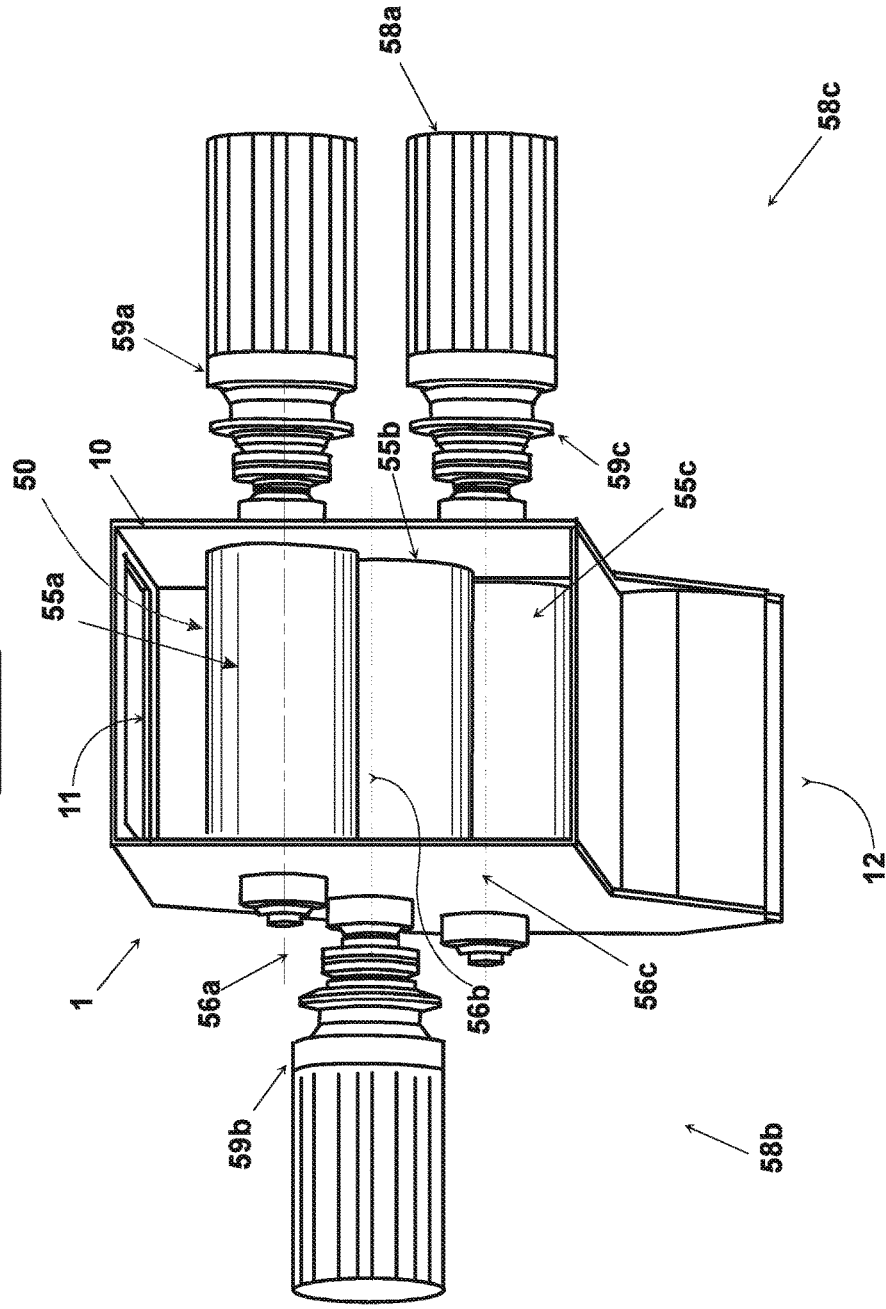

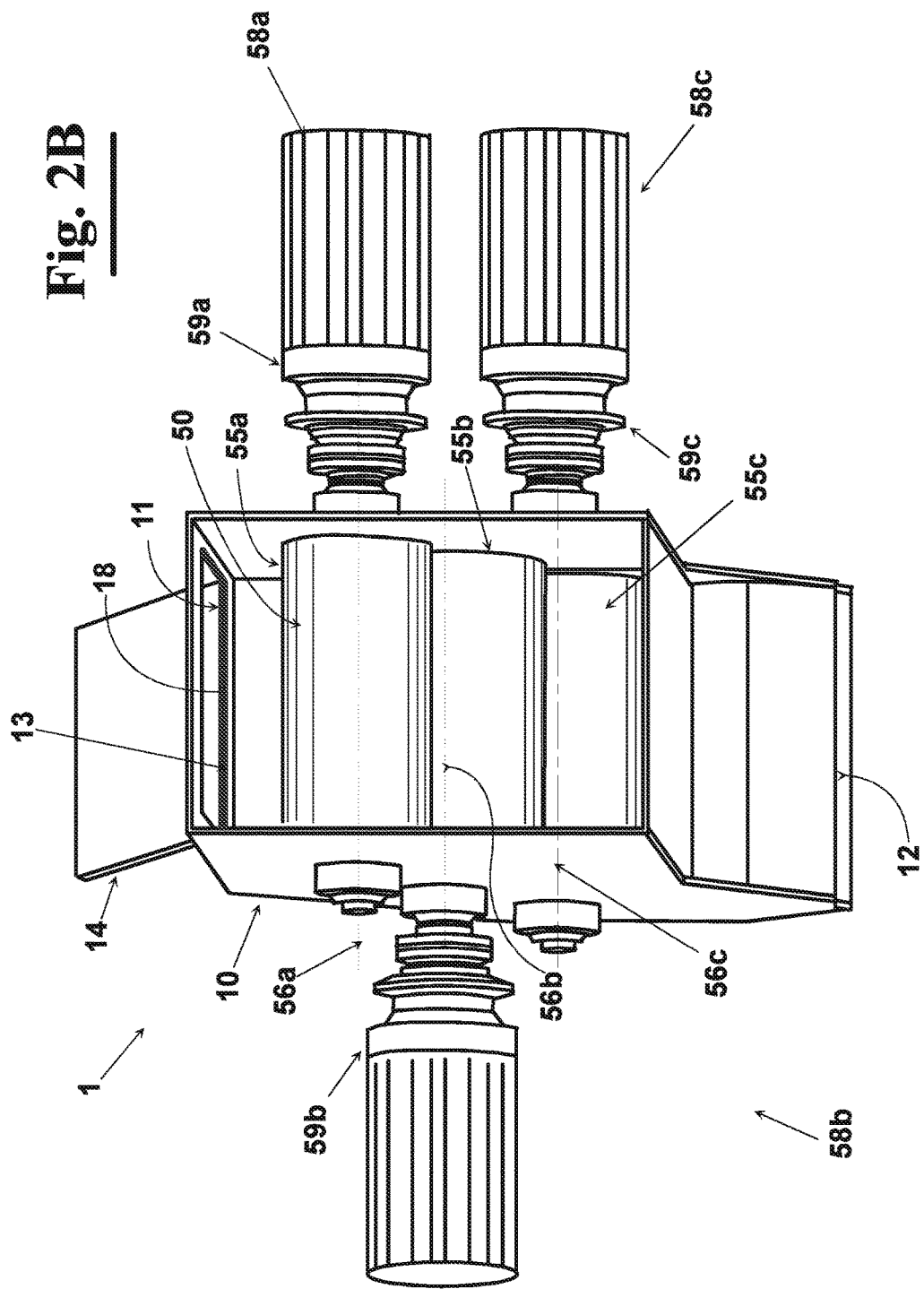

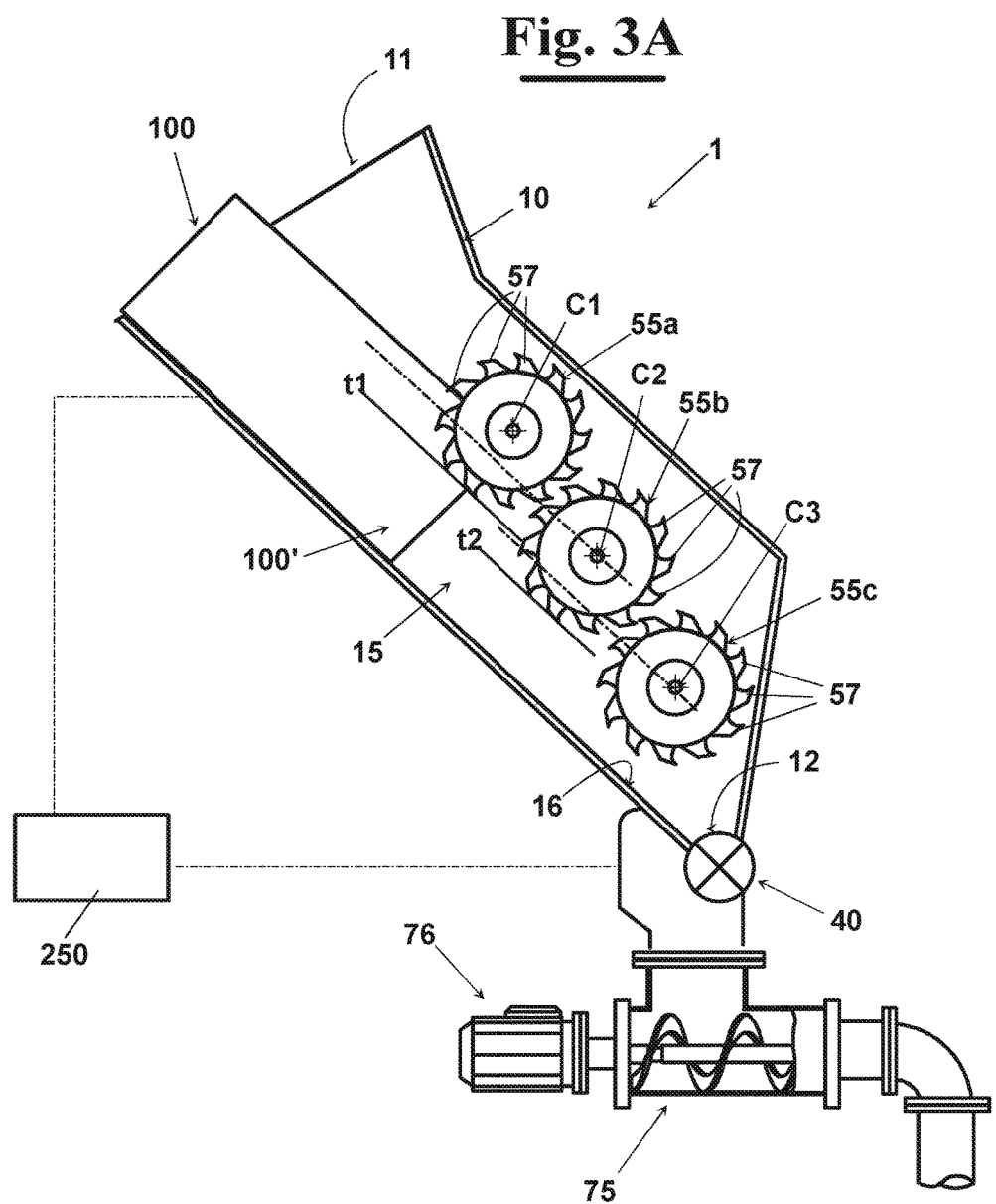

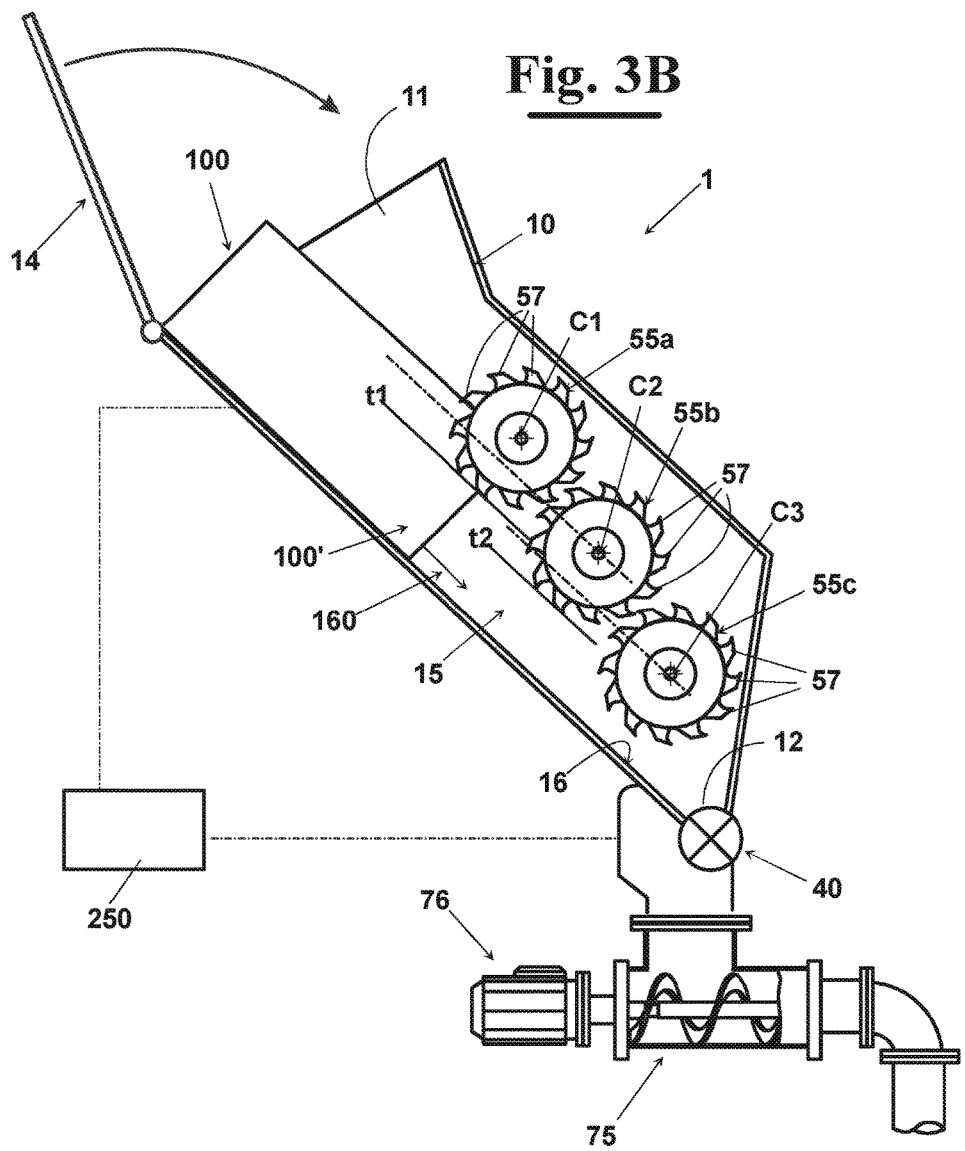

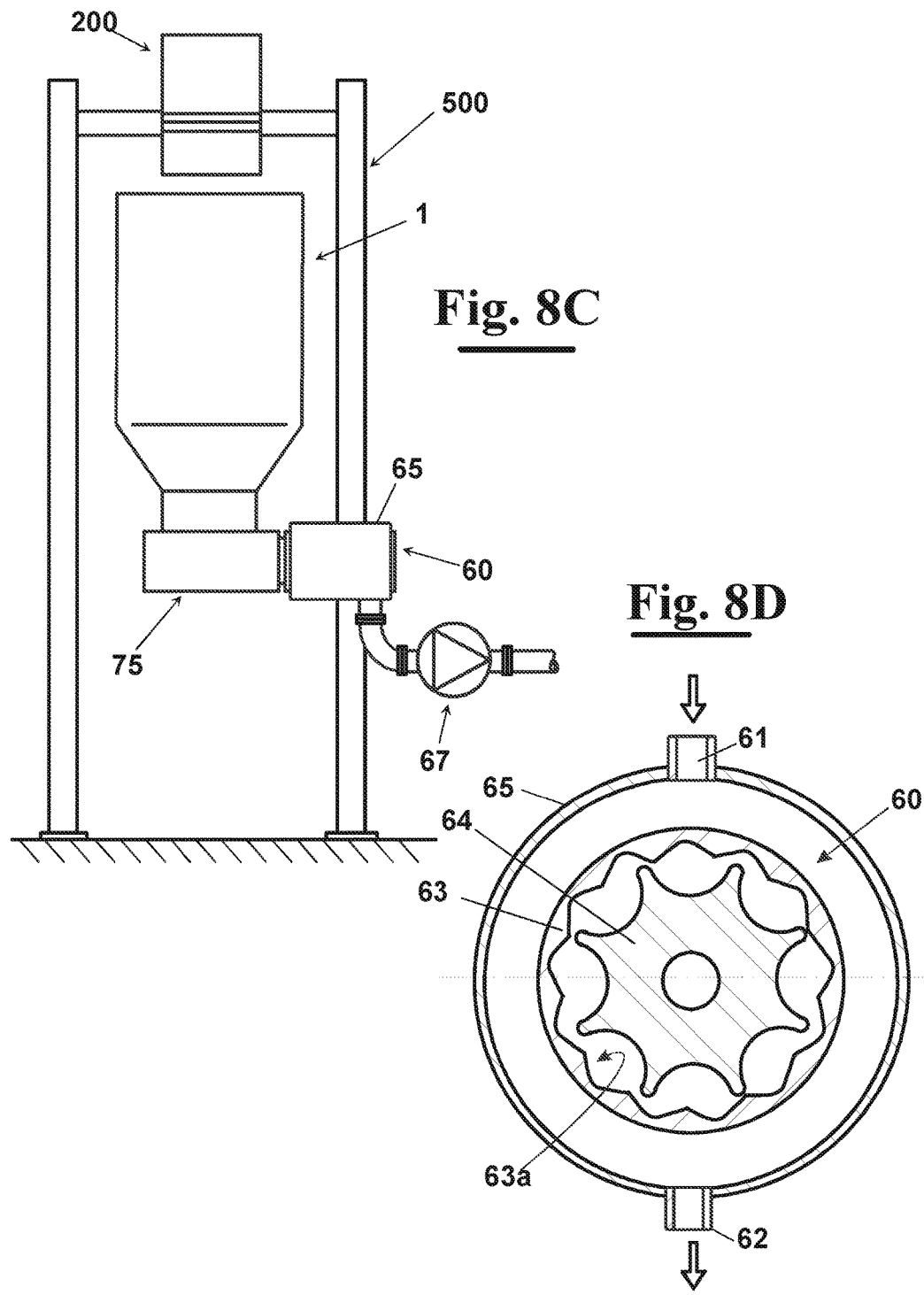

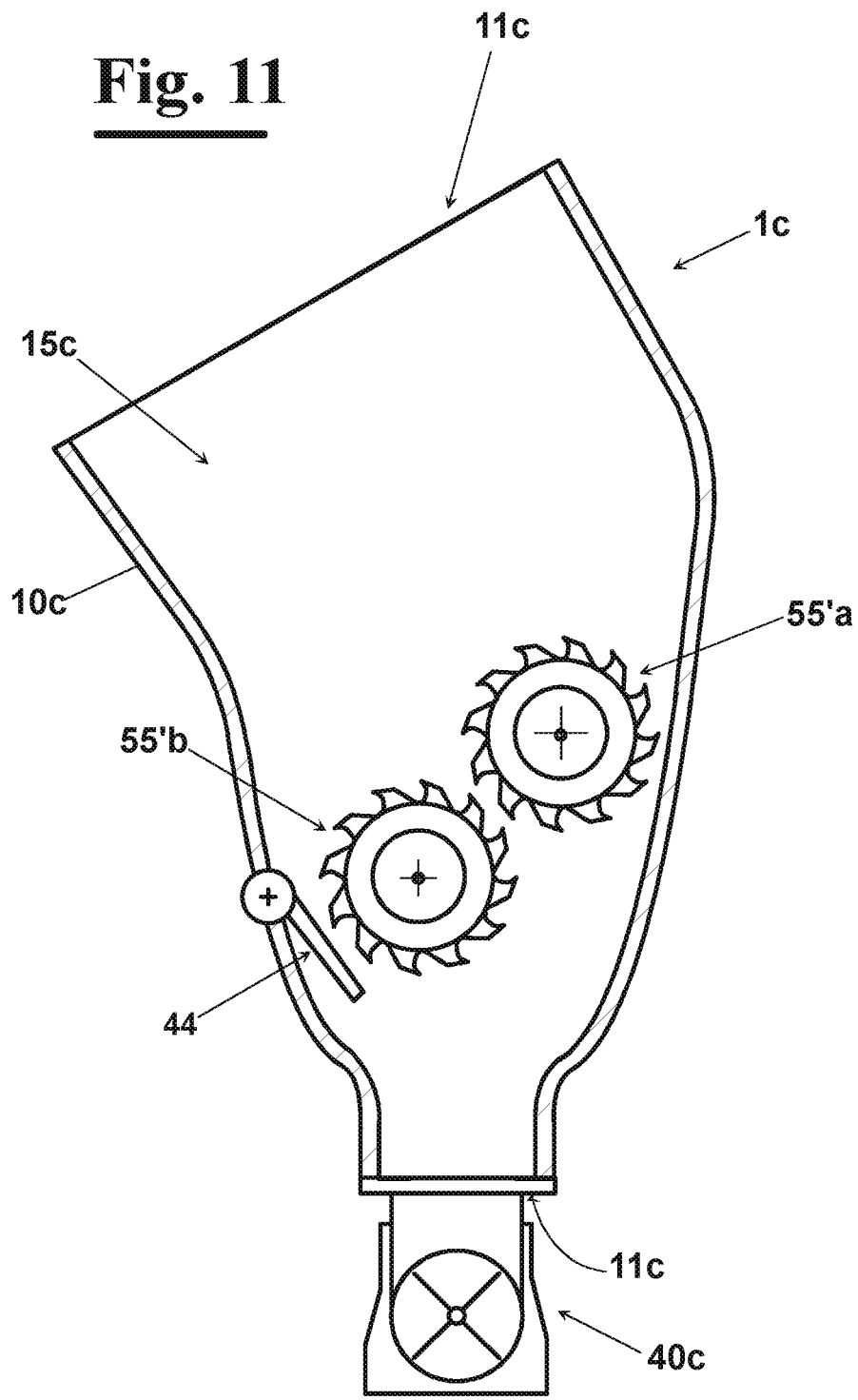

CRUSHING MACHINE FOR A FOOD PRODUCT THAT IS FROZEN IN BLOCKS, OR IN IQF FORM, AND PLANT COMPRISING SUCH A MACHINE FOR MAKING PUREE, OR JUICE, FROM A FOOD PRODUCT

FIELD OF THE INVENTION

The present invention relates to the field of machines for the food industry, and, in particular it relates to a crushing machine a food product that is frozen in blocks, or in IQF form. The invention relates also to a plant for extracting puree, or fruit juice from vegetable food having such a food crushing machine.

DESCRIPTION OF THE PRIOR ART

As well known, a variety exists of types of machines for extraction of juice, or puree, mainly from vegetable food, fruit and vegetables, but also from animal food, meat and fish.

Normally, the starting product is softened, or chopped, more or less finely, in a first step, and is then put in an extraction machine in a second step. The extraction machines of the prior art essentially comprise a fixed structure that comprises a perforated sheet of cylindrical or conical shape, called "sieve", and by a rotor having blades that rotates inside. The rotor is mounted to a shaft and caused to rotate quickly by a motor. In particular, the chopped product, or softened, is pushed radially by centrifugal force continuously against the sieve. This way, the puree and the liquid part of the product that is conveyed are filtered through the holes and then receive further treatments. The solid fractions, the so-called waste, that do not pass through the sieve, instead, are carried axially opposite to the inlet and are automatically conveyed to an unloading port. See for example IT1199392.

The starting vegetables for making the puree can be fresh, or frozen.

Even if the frozen products are more expensive to treat, since they remain for more time in the production cycle, they can be advantageous for better preserving the vegetables, for example to cover long transportation routes and for keeping unchanged with time the taste in case of vegetables that perish quickly after harvesting.

Presently, many processes are known for extraction of puree and/or juice from a vegetable product, which is kept at a temperature lower than zero degrees, or in any case, completely or partially frozen.

The product is normally preserved at different temperatures under zero in various forms and size, such as blocks or drums, and IQF form (Individually Quick Frozen). In the first case, the blocks or drums of food products are previously frozen in the form of parallelepiped, or of cylinder, which can have standard size, weighing about 200 kg.

In case of IQF form, the food product is frozen singularly, or in small blocks, and kept in loose pieces.

Since the product is normally preserved frozen for several months, accordingly, with higher costs, it is necessary to maintain as far as possible unchanged the taste and quality, in order to avoid spoiling a product whose cost is definitely higher than fresh ones.

When taken out from a freezer (temp. from −30° C. to 0° C.) the frozen products have a hardness comparable to that of ice and cannot be treated with usual devices for making puree from fresh vegetables, or from completely defrosted food. Therefore, the product is preliminarily defrosted.

Normally, common defrosting systems use the vapor as heat exchange fluid, even if plants are known that use the electric energy, either directly by means of electric resistances, or indirectly by means of microwaves, or other devices that generate electric, or magnetic fields. They provide normally a conveyor belt of the product, normally supplied as IQF form, up to a screw conveyor where is carried out direct or indirect injection of vapor. In the screw conveyor the product moves slowly and is subjected to gradual continuous heating up to complete defrosting. Then a possible step of softening is provided to assist the extraction.

One of the major problems met in treating a completely defrosted vegetable product, is that when defrosting, it is subjected to quick deterioration. In fact, after a few minutes after defrosting, enzymatic phenomena start, like oxidation, which change suddenly the color, the consistency and the taste.

In case of frozen product the extraction plant has some limits of production rate given mainly to the size of the blocks of frozen product.

Usually, in fact, the blocks of frozen product that are not provided as IQF form and that are fed to the production plant are higher than 300×100×500 mm. In this case the vegetable product is simply put in a bag and frozen in such a way that, since it is a humid product, by freezing it forms a single frozen block comprising many fruit, or vegetable pieces.

For overcoming the above described drawbacks, upstream of known machines that extract the puree, or the juice, from the vegetable product, crushing machines, or crushing machines, are arranged, also known as "crusher", which crush and chop the fresh product, or frozen product, into fragments of reduced size and precisely between several mm to 1-2 cm. These food crushing machines are, in fact, designed for cutting, or chopping, the vegetable product, or frozen product, into fragments as small as possible, since the smaller the size of the fragments fed into the machines that perform the extraction the larger the efficiency of such machines.

For the above described reasons, the known food crushing machines cause often a deterioration of the vegetable product. In fact, both in case of fresh product with temperature between about 2° C. and 5° C., and in case of frozen product with temperature between about −25° C. and 0° C., the crushing action operated by the crushing machine causes a break of the vegetable product and then frees oxidative and pectolytic enzymes before the extraction of the juice, or the puree, and then jeopardizes the quality of the final product.

Furthermore, the food crushing machines presently used for crushing the frozen product into fragments of predetermined size are dedicated machines, i.e. arranged to process either one product that is frozen in blocks, or one frozen product as IQF form. This occurs because according to the kind of treated product it is necessary to use specific technical solutions.

Another drawback of the known production plants that treat frozen vegetables of large size, is a discontinuity of feeding the processing line that is caused by the need, on the one hand, of machines that are sized for operating with substantially constant production rate, such as the extraction machines and the softening machine s, and, on the other hand, of machines that work in a discontinuous way, such as the machines that move bags or drums of frozen product, and that load discontinuous batches product on the conveying lines. There is, therefore, a difficulty to measure the flow of the product conveyed along the processing line.

This drawback makes very difficult the production of a kind of product that is presently very successful on the market, i.e. a mixture of different vegetable products, corresponding to predetermined recipes, since it is not possible to adjust precisely the amounts of products to mix together.

SUMMARY OF THE INVENTION

It is then a feature of the invention to provide a crushing machine for a frozen vegetable food product that can overcome the drawbacks of the prior art.

It is also a feature of the present invention to provide such a machine arranged to process both frozen products in blocks and frozen products in IQF form.

It is another feature of the present invention to provide such a crushing machine that can turn quickly from the configuration for treating product that is frozen in blocks to the configuration for treating frozen product in IQF form, and vice-versa.

It is still another feature of the invention to provide such a crushing machine that can work under vacuum, or to a predetermined working pressure.

It is still a further feature of the invention to provide an apparatus that comprises such a crushing machine for making puree, or juice, of food product.

It is also a feature of the present invention to provide a plant for making puree, or juice, from products of vegetable origin to make with maximum precision recipes, or a mixture of different products.

It is a further feature of the present invention to provide a plant for making puree, or juice, from products of vegetable origin that can adjust in a precise way the frozen product fed to the crushing machine in it provided, in order to ensure a fixed flowrate downstream of the crushing machine.

It is a further feature of the present invention to provide a method for making puree, or juice, from products of vegetable origin that has the same advantages.

These and other objects are also achieved by a crushing machine a frozen vegetable food product in blocks, or in IQF form, in a way to obtain a crushed product consisting of a plurality of fragments of predetermined size and, accordingly, to provide substantially a chopped frozen vegetable food product, said machine comprising:
- a box-like container body defining a crushing chamber, said box-like body having an inlet port through which said frozen food product is put in the crushing chamber and an outlet port through which the crushed product is discharged from the crushing chamber;
- a crushing unit arranged in the crushing chamber, said crushing unit comprising a plurality of crushing rollers each of which arranged to rotate about a respective rotation axis and having peripherally a plurality of teeth arranged to cut the product that is frozen in blocks, or IQF form, for splitting it into said fragments of predetermined size;
- a distribution valve associated with said outlet port, said distribution valve arranged to adjust the amount of crushed product discharged from said machine through said outlet port;
- a selection means which is adapted to select a working configuration chosen among: a first configuration, where said machine is configured to treat said product that is frozen in blocks and a second configuration, where said machine is configured to treat said frozen product in IQF form.

In particular, the distribution valve is of volumetric type. Therefore, to calculate the amount of frozen product discharged from the crushing machine with time, i.e. at the capacity to the machine same, it is enough to know the speed of the distribution valve.

In particular, the distribution valve can have a main body and a movable part with respect to said main body, said movable part equipped with at least one recessed portion arranged to be located between a loading position, in which said recessed portion is oriented towards said treatment chamber and the fragments of frozen product are kept inside, and an unloading position, in which said recessed portion is oriented towards an outlet of said main body and said fragments are discharged from said recessed portion and sent downstream of said distribution valve.

In an exemplary embodiment, the distribution valve has a plurality of recessed portions arranged to be selectively located between said loading position and said unloading position.

Advantageously, the movable part of the distribution valve is arranged to move from the loading position to the discharge position through a rotation about a rotation axis.

Preferably, the distribution valve has a substantially cylindrical shape.

In this case, the or each recessed portion can have cross section substantially like a circle sector.

Preferably, said plurality of crushing rollers comprises:
- a first crushing roller having peripherally a plurality of teeth arranged to cut said frozen block product;
- at least a second crushing roller that is located downstream of the first crushing roller in the conveying direction of the frozen product in the machine, said second crushing roller being also having peripherally a plurality of teeth, said first and said second crushing roller being configured in such a way that the teeth of the roller that is located downstream protrude beyond the teeth of the roller that is located upstream in a direction substantially orthogonal to the conveying direction of the frozen product along the crushing machine, i.e. they are arranged close to the wall of the machine along which the treated product slides.

Preferably, the rotation axis of the roller downstream is arranged above a plane defined by the axis of the roller that is located upstream and by the conveying direction of the product in the machine.

In particular, the teeth of each roller are curved and arranged to be oriented towards the frozen product in movement along the machine, in order to have a cutting angle of the teeth that is ideal for increasing the capacity of penetrating the frozen product.

Advantageously, the product at a slide wall, i.e. at the wall along which the frozen product can slide in the crushing machine, has at least one movable wall, and an operation unit is provided arranged to bring said, or each, movable wall to a predetermined position having a predetermined inclination with respect to said slide wall.

More in detail, the inclination of the or each movable wall is adjustable, in order to increase, or decrease, the distance between the crushing rollers and the surface on which the frozen product slides, i.e. the surface of the or each movable wall. This way, it is possible to adjust the flowrate of the product in the crushing machine; in particular it is possible to adjust the crushing rate and the size of the fragments of chopped product.

In particular, in case of frozen product in IQF form, if the flow rate has to be increased, the or each movable wall is lowered towards the slide wall for the product, in order to increase the distance between the rollers and the slide wall. On the contrary, if the flow rate has to be decreased, the or each movable wall is inclined further, bringing it away from the slide wall, in order to reduce the distance between the roller and the slide wall.

In case of product that is frozen in blocks, instead, for increasing the flowrate of the product, the or each movable wall is inclined towards the rollers, i.e. it is minimum the distance between the wall and the crushing rollers. This way, in fact, the product is forced against the teeth of the crushing rollers and a stronger crushing action on the frozen product is caused.

A metered supply of the product downstream is then made exploiting one, or more of the devices above described according to the type of frozen treated product.

According to another aspect of the invention, an apparatus for making puree, or juice, from a food product that is frozen in blocks, or in IQF form, comprises:
    a crushing machine as described above;
    a feeding device arranged to feed the product that is frozen in blocks, or in IQF form, to said crushing machine;
    an adjustment member arranged to operate said feeding device responsive to the amount of product present in said crushing machine and/or the amount of product discharged from said crushing machine, in order to have an adjustment of the flowrate of frozen crushed product at the outlet of the crushing machine;
    a measuring device configured to measure the amount of product present in the crushing chamber and to send a measurement signal to said adjustment member; and/or
    a flow measuring device of frozen crushed product discharged from the crushing machine and configured to send a flow signal to said adjustment member.

In particular, if the frozen treated product is a product that is frozen in blocks, the measuring device is configured to measure the electric power adsorbed by motors that arranged to operate the rotation of the crushing rollers, said adjustment member arranged to operate said feeding device responsive to said signal of electric power adsorbed.

In particular, the measuring device of the flow of frozen product discharged from the crushing machine is configured to measure the speed of the distribution valve and to send a corresponding flow signal to the adjustment member. Actually, since the distribution valve operates as volumetric machine, by knowing the volume of the same and the speed of the valve the flow discharged in the unit is determined versus time and then flow rate of the frozen crushed product is determiner.

In particular, in case of frozen product in blocks, or in IQF form, the feeding device can be a discontinuous feeding device arranged to feed within predetermined time ranges the amount of frozen product in the crushing chamber.

For example, the feeding device of the frozen food product can be a tilter arranged to tilt at predetermined time intervals a plurality of containers containing said frozen product, in order to put the frozen product in the crushing chamber.

Alternatively, the feeding device for the food product can be arranged to feed continuously the food product to the crushing chamber. In this case the feeding device can be, for example, a conveyor belt, or a screw conveyor, or similar devices.

Advantageously, the outlet port of the crushing machine is connected to a push device, for example a screw conveyor, arranged to feed the frozen crushed product at the outlet of the crushing machine to a treating machine arranged to fluidify said frozen crushed product.

The apparatus can also comprise an extracting machine comprising:
    a fixed sieve having a plurality of holes;
    a rotor arranged in said sieve to rotate about a rotation axis, said rotor having a plurality of blades configured to force a product entering said machine against said sieve, in order to separate said entering product into a main product comprising said puree, or juice, which crosses said sieve and is discharged through a first outlet, and into a waste material that, instead, cannot cross said sieve and is discharged through a second outlet.

According to a further aspect of the invention, a plant for making a mixture of puree, or juice, from at least a first and a second vegetable food product to obtain a predetermined recipe comprises:
    a first processing line of a first vegetable food product, along said first processing line the following being comprised:
        a first crushing machine arranged to divide said first vegetable food product into fragments of predetermined size, said first crushing machine equipped with an inlet port through which said vegetable food product is put in a crushing chamber in which a crushing unit is arranged, and an outlet port through which said fragments of predetermined size are discharged from said crushing chamber;
        a first treatment section arranged to treat said fragments of predetermined size obtaining a first treated product;
        first feeding device arranged to feed said first food product in said crushing chamber of said first crushing machine;
        a flow measurement section of said first vegetable food product conveyed along said first processing line of said product;
    a second processing line of a second vegetable food product, along said second processing line comprising:
        a second crushing machine arranged to divide said second vegetable food product into fragments of predetermined size, said second crushing machine equipped with an inlet port through which said vegetable food product is put in a crushing chamber in which a crushing unit is arranged, and an outlet port through which said fragments of predetermined size are discharged from said second crushing chamber;
        a second feed device arranged to feed said second food product in said crushing chamber of said second crushing machine;
        a second treatment section arranged to treat said fragments of predetermined size obtaining a second treated product;
        a second flow measurement section of said second vegetable food product conveyed along said second processing line of said product;
    whose main feature is of providing, furthermore:
    an extraction section operatively connected to said first and to said second processing line, wherein said extraction section is configured to receive a predetermined relative quantity of said first treated product and of said second product and to cause a separation of a starting product into a main product containing puree, or juice, and into a waste material, said main product consisting of a mixture of said first and of said second treated product corresponding to a predetermined recipe;

and that at least one among said first and said second flow measurement section is located upstream of said treatment section.

In a possible exemplary embodiment of the invention, the flow measurement section is configured to measure the flow of said frozen crushed product through a volume measurement. In another possible exemplary embodiment, instead, the flow rate measurement is made by a measurement of the production rate of the crushing machine.

Advantageously, at least one among the first and the second processing line is configured to treat a product that is frozen in blocks, or frozen in IQF form, i.e. comprises a crushing machine as described above.

In particular, as treatment section a section is comprised in which at least one treating machine is arranged, for example a softening machine, arranged to make the product more "fluid".

Preferably, the extraction section has an inlet connected to said first and said second processing line, in said extracting machine the following being mounted:
  a fixed sieve having a plurality of holes of predetermined size;
  a rotor arranged in said sieve to rotate about a rotation axis, said rotor having a plurality of blades configured to force a product entering in said machine against said sieve, in order to separate said entering product into a main product comprising said puree, or juice, which crosses said sieve and is discharged through a first outlet, and into a waste material that, instead, cannot cross said sieve and is discharged through a second outlet.

Actually, in this case the extracting machine is arranged to mix and homogenize the first and the second softened product in the above described predetermined proportions corresponding to a predetermined mixture.

In particular, the crushing machine of the processing line that is arranged to treat the product that is frozen in blocks, or in IQF form, is of the type above described, i.e. comprises:
  a box-like container body defining a crushing chamber, said box-like body having an inlet port through which said frozen food product is put in the crushing chamber and an outlet port through which the crushed product is discharged from the crushing chamber;
  a crushing unit arranged in the crushing chamber, said crushing unit comprising a plurality of crushing rollers each of which arranged to rotate about a respective rotation axis and having peripherally a plurality of teeth arranged to cut the product that is frozen in blocks, or IQF form, for splitting it into said fragments of predetermined size;
  a distribution valve associated with said outlet port, said distribution valve arranged to adjust the amount of crushed product discharged from said machine through said outlet port.

Advantageously, the softening section comprises at least one first softening machine arranged to soften said fragments of fresh product through a quick succession of pulses, such that a fresh softened product is obtained.

Preferably, in the extraction section at least one extracting machine is present having a rotor configured to work in combination with a sieve having a plurality of holes, in order to separate said treated product into a main product comprising said puree, or juice, which crosses said sieve and is discharged through a first outlet and into a waste material that, instead, cannot cross said sieve and is discharged through a second outlet.

Advantageously, one of the processing lines is configured to treat a vegetable fresh product and has a load cell arranged to weigh said fragments discharged from the machine before these are sent to the softening section.

In particular, along the first processing line of the vegetable fresh product a conveyor belt can be provided arranged to transfer the vegetable fresh product from a first height $q1$ to a second height $q2$, with $q2>q1$, at which said food fresh product is put in said crushing machine.

The crushing machine above described can be equipped with a cover associated with the inlet mouth, said cover arranged to pass from an open position, in which said cover allows the access to the inlet port and, accordingly, the introduction of the product in the crushing chamber, and a closed position, in which the cover is arranged to block the inlet mouth.

Preferably, sealing elements are provided that are located between the cover and a boundary edge of the inlet mouth. The sealing elements are adapted to insulate pneumatically the crushing chamber from the outer environment when said cover is in said closed position.

Furthermore, additional sealing elements can be provided associated with the distribution valve configured to allow a movement, in particular a rotation, of machine movable fragments and in the meantime to ensure a pneumatic insulation of the crushing chamber from the outer environment. Even the dividing movable walls can be associated with further pneumatic sealing elements for the movement of the movable wall from a working position to another working position, but in the meantime to ensure the pneumatic insulation of the crushing chamber.

Advantageously, a pressure adjustment member is provided in the crushing chamber. More in detail, the adjustment member is adapted to keep a predetermined void ratio, or a predetermined pressure higher than atmospheric pressure, in the crushing chamber.

According to still another aspect of the invention, a method for making a mixture of puree, or juice, of at least a first and a second vegetable food product to obtain a predetermined recipe comprises the steps of:
  feeding a first vegetable food product along a first processing line;
  crushing said first food product from a first crushing machine obtaining fragments of predetermined size, said first crushing machine equipped with an inlet port through which said vegetable food product is put in a crushing chamber in which a crushing unit is arranged, and an outlet port through which said fragments of predetermined size are discharged from said crushing chamber;
  treating said fragments of predetermined size obtaining a first softened treated product;
  measuring the flow rate of said first treated product conveyed along said first processing line of said product;
  feeding a second vegetable food product along a second processing line;
  crushing said second food product by a second crushing machine obtaining fragments of predetermined size, said second crushing machine equipped with an inlet port through which said vegetable food product is put in a crushing chamber in which a crushing unit is arranged, and an outlet port through which said fragments of predetermined size are discharged from said second crushing chamber;

treating said fragments of predetermined size obtaining a second treated product;

measuring the flow rate of said second vegetable food product conveyed along said second processing line of said product;

said method characterized in that it provides also the steps of:

feeding a predetermined relative quantity of said first product and of said second product in an extraction section connected to said first and to said second processing line;

separating in said extraction section a starting product containing said predetermined relative quantity of said first treated product and of said second product, into a main product containing puree, or juice, and into a waste material, said main product consisting of a mixture of said first and of said second treated product corresponding to a predetermined recipe;

and in that at least one step of measuring the flow rate is provided upstream of said treatment section and which determines the flow of said frozen crushed product through a volume measurement.

BRIEF DESCRIPTION OF THE DRAWINGS

The invention will be now shown with the following description of an exemplary embodiment thereof, exemplifying but not limitative, with reference to the attached drawings in which:

FIG. 2A diagrammatically shows the machine of FIG. 1 in a perspective rear view for highlighting some technical features;

FIG. 3A diagrammatically shows the machine of FIG. 2A a cross sectional view for highlighting some components;

FIG. 2B diagrammatically shows an exemplary embodiment of the machine of FIG. 2A in a perspective rear view for highlighting some technical features;

FIGS. 3B and 3C diagrammatically show, respectively in a configuration of loading and in an operating configuration, the machine of FIG. 3A a cross sectional view of highlighting some components;

FIGS. 8B, 8C, and 8E diagrammatically show some exemplary embodiments of an apparatus having the crushing machine of FIG. 1;

FIG. 8D shows a cross sectional view of a treating machine used downstream of the crushing machine in the apparatus of FIG. 8C;

FIG. 11 diagrammatically shows a crushing machine for a frozen product in IQF form that can be used in the industrial plant of FIG. 9, or 10.

DESCRIPTION OF EXEMPLARY EMBODIMENTS

Figure 1:
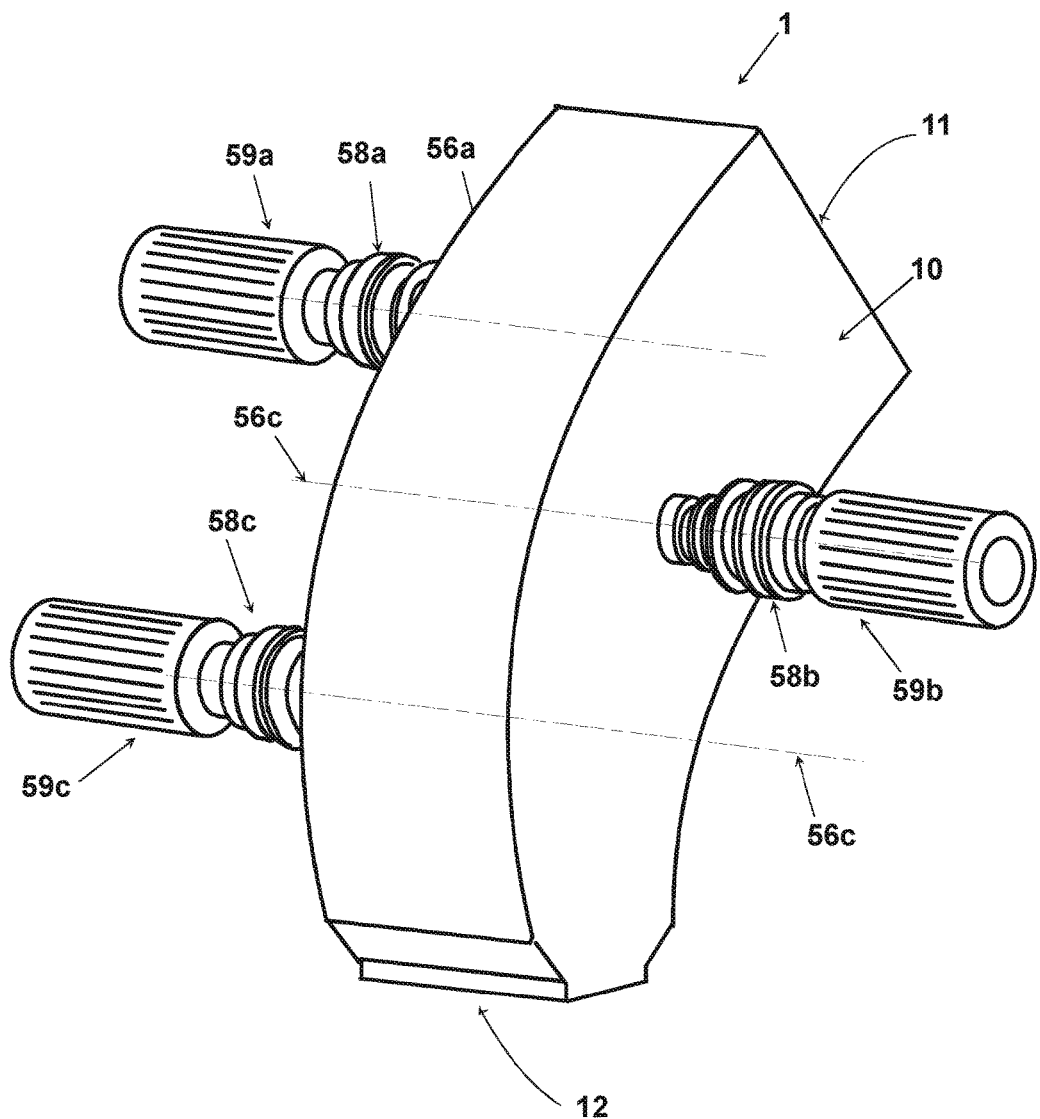
FIG. 1 diagrammatically shows a perspective view of a first exemplary embodiment of a machine, according to the invention, for crushing frozen products of vegetable origin.

In FIG. 1 for example a crushing machine 1 is shown, according to the invention, for crushing a vegetable food product 100 that is frozen in blocks 100', or is provided in IQF form 100".

In particular, machine 1 comprises a box-like body 10 defining a crushing chamber 15. Box-like body 10 has an inlet port 11, through which the frozen food product 100 is put in crushing chamber 15 and an outlet port 12 through which a frozen crushed product is discharged from crushing chamber 15.

In crushing chamber 15 a crushing unit 50 is mounted, comprising a plurality of crushing rollers 55, for example three crushing rollers 55a-55c. Each crushing roller 55a-55c is arranged to rotate about a respective rotation axis 56a-56c and has peripherally a plurality of teeth 57 arranged to cut frozen product 100 in blocks, or in IQF form, for splitting it into the above described fragments of predetermined size. In particular, the rotation axes 56a-56c of the crushing rollers 55a-55c are parallel to each other. Furthermore, outlet port 12 is provided associated with a distribution valve 40 arranged to adjust the amount of crushed product discharged from machine 1 through outlet port 12.

Preferably, selection means 250 are also provided, arranged to select a working configuration chosen among: a first configuration, where the machine is configured to treat the product that is frozen in blocks and a second configuration, where the machine is configured to treat the frozen product in IQF form 100". If crushing machine 1 is configured to treat frozen product in IQF form, rollers 55 carry out mainly an action of handling the product, in order to avoid that can compact again and therefore can cause machine 1 to jam.

Figure 4:
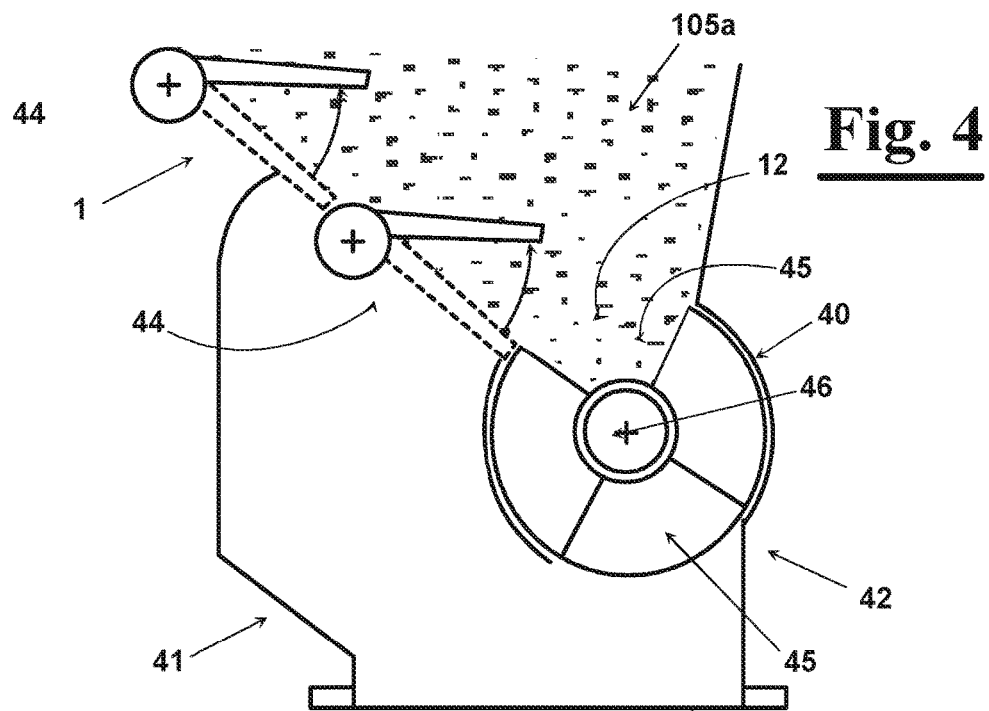
FIGS. 4 and 5 show in detail, respectively in a loading position and in an unloading position, a distribution valve that can be associated with the machine for FIGS. 1-3 for adjusting the crushed product, in particular in IQF form that is then crushed.
Figure 5:
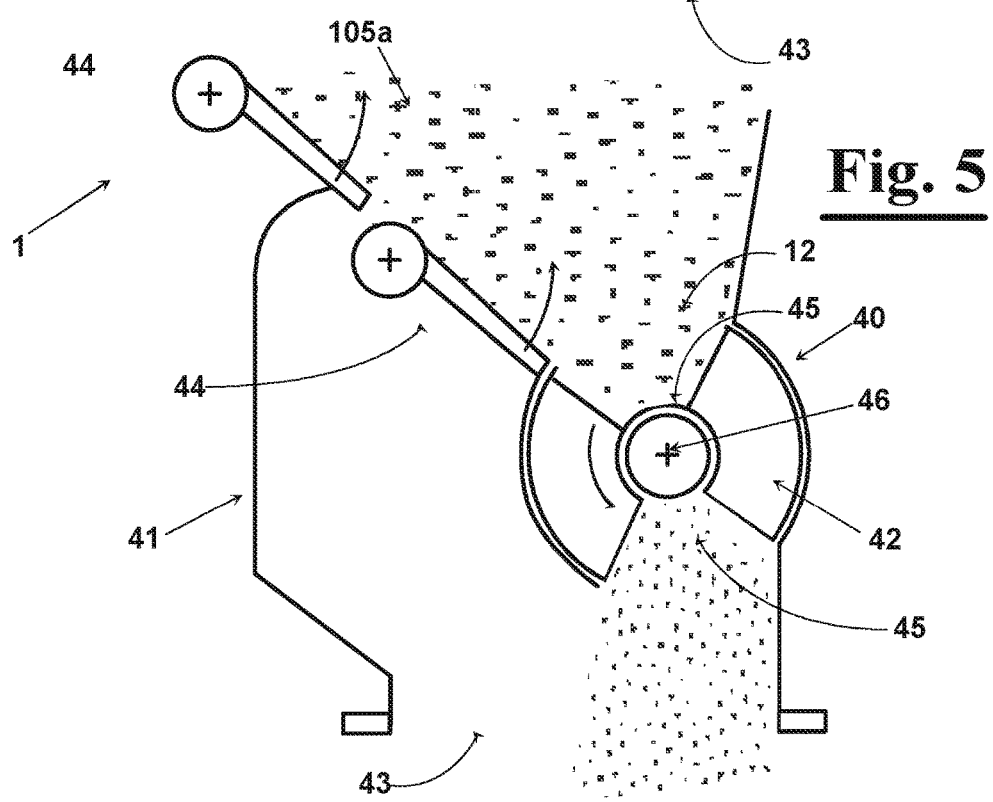
Figure 6:
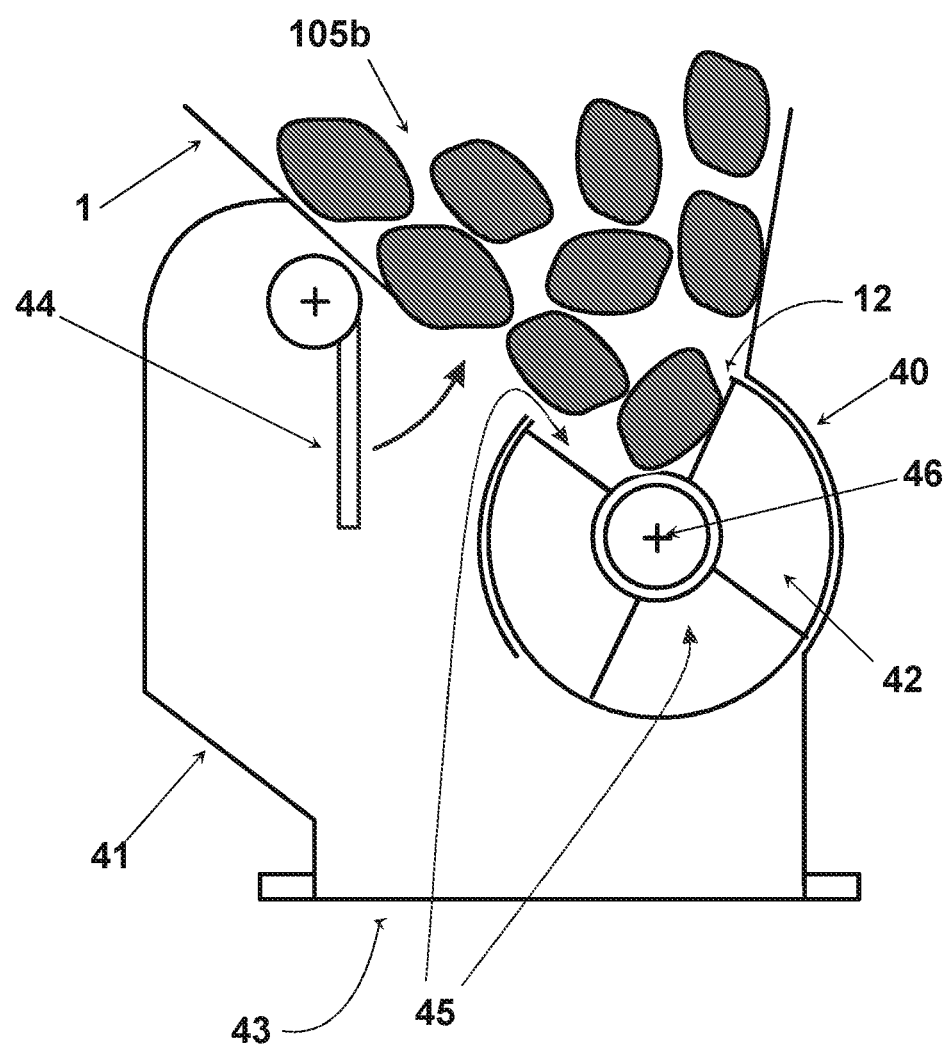
FIG. 6 shows in detail the valve of FIG. 4 if the machine treats a product that is frozen in blocks.

As shown in detail in FIGS. 4 to 6, distribution valve 40 has a main body 41 and of a movable part 42, which can move with respect to the main body 41. More in detail, movable part 42 has at least one recessed portion 45, in the case shown in the figure there are two recessed portions 45. Each recessed portion 45 is alternatively moved between a loading position, in which it is oriented towards crushing chamber 15 of machine 1 and therefore the fragments 105 of frozen product can be put inside the recessed portion, and an unloading position, in which the fragments 105 are discharged from the recessed portion 45 and then from the body 41 of valve 40 through an outlet 43. For example, the movement of movable part 42 of distribution valve 40 can be caused by exceeding a certain load limit of crushed product in the recessed portion, or being a predetermined and caused by actuating means. Therefore, a means can be provided by contrast arranged to oppose to the movement, for example to the rotation of movable part 42, up to exceeding said load limit and to allow movable part 42 to move once achieved the load limit. Alternatively, the movement of movable part 42 can be triggered by a timer, i.e. operated after predetermined time ranges.

In the case shown in FIGS. 4 and 5, movable part 42 of distribution valve 40 is arranged to move from a loading position (FIG. 4) to a discharge position (FIG. 5) through a rotation about a rotation axis 46. Still with reference to FIGS. 4 and 5 distribution valve 40 can have a substantially cylindrical shape and the recessed portion 45 can have a cross section forming a circle sector. For example, the circle sector can have a centre angle α set between about 20° and about 120°.

As diagrammatically shown in FIG. 3, the crushing rollers 55a-55c and crushing chamber 15 are configured in such a way that teeth 57 of the crushing roller, for example downstream of roller 55b, protrude beyond the teeth of the roller that is located upstream, i.e. roller 55a, in the direction of slide wall 16. In the case shown in FIG. 3, rollers 55a-55c are provided 3. Therefore, in this case, teeth 57 of roller 55c protrude beyond the teeth of roller 55b in the direction substantially orthogonal to the conveying direction 160 the frozen product along crushing machine 1.

Rollers 55a-55c can have all a substantially equal diameter and can be arranged in crushing chamber 15 with the first roller 55a farthest from slide wall 16a, which is arranged for a sliding contact of frozen product 100e, whereas last roller 55c is close to slide wall 16. In particular, crushing chamber 15 can be provided at a predetermined angle in such a way that slide wall 16 acts as chute guide and assists the movement of the product along machine 1. In an exemplary embodiment, rollers 55a-55c can be arranged along a substantially vertical direction and have increasing diameter, in order to achieve the above described effect. In a further exemplary embodiment a combination is provided of the above described features.

Teeth 57 of each roller 55a-55c can be curved and oriented towards frozen product 100 conveyed along machine 1, in order to have an ideal cutting angle, thus increasing, the capacity to penetrate the treated product. Each crushing roller 55a-55c is also advantageously arranged to rotate about the respective rotation axis 56a-56c at a low rotation speed, in order to crush gradually frozen product 100 in block, or in IQF form. To achieve this goal, motors 58a-58c that operate the movement of each crushing roller 55a-55c can be associated with a respective gear motor 59a-59c, which is oversized. This way, graduated crushing is obtained of the treated product that assists its distribution by valve 40.

As diagrammatically shown in FIGS. 4 to 6, at outlet port 12 and near distribution valve 40 at least one movable wall 44 can be provided. Each movable wall 44 is moved by selection means 250 for arranging it in a predetermined position, i.e. with a predetermined inclination with respect to slide wall 16. More in detail, when in machine 1 a frozen product in IQF form is treated, an operating configuration is used to decrease the flow rate, in which movable wall 44 is at a distance from slide wall 16 and close to rollers 55a-55c. In fact, when movable walls 44 are at an angle with respect to the wall 16, the passage cross section for frozen product 100 in IQF form is reduced and then the flowrate decreases, whereas when dividing walls 44 are substantially at a same height as wall 16, the passage cross section increases and therefore increases the flowrate of the product in IQF form.

If frozen product 100 is in the form of blocks, instead, the more dividing walls 44 are at an angle with respect to slide wall 16, the more energetically the product 100 is forced against teeth 57 of rollers 55 and is crushed by the action of the rollers, whereas the more dividing walls 44 are at a distance from rollers 55, the lower is the energy with which the product 100 is crushed by teeth 57. Therefore, contrarily to the case of frozen product in IQF form, in case of frozen product 100 in blocks a higher flow rate can be obtained increasing the inclination of dividing walls 44, whereas to decrease the flowrate the inclination of dividing walls 44 can be decreased.

Figure 7:
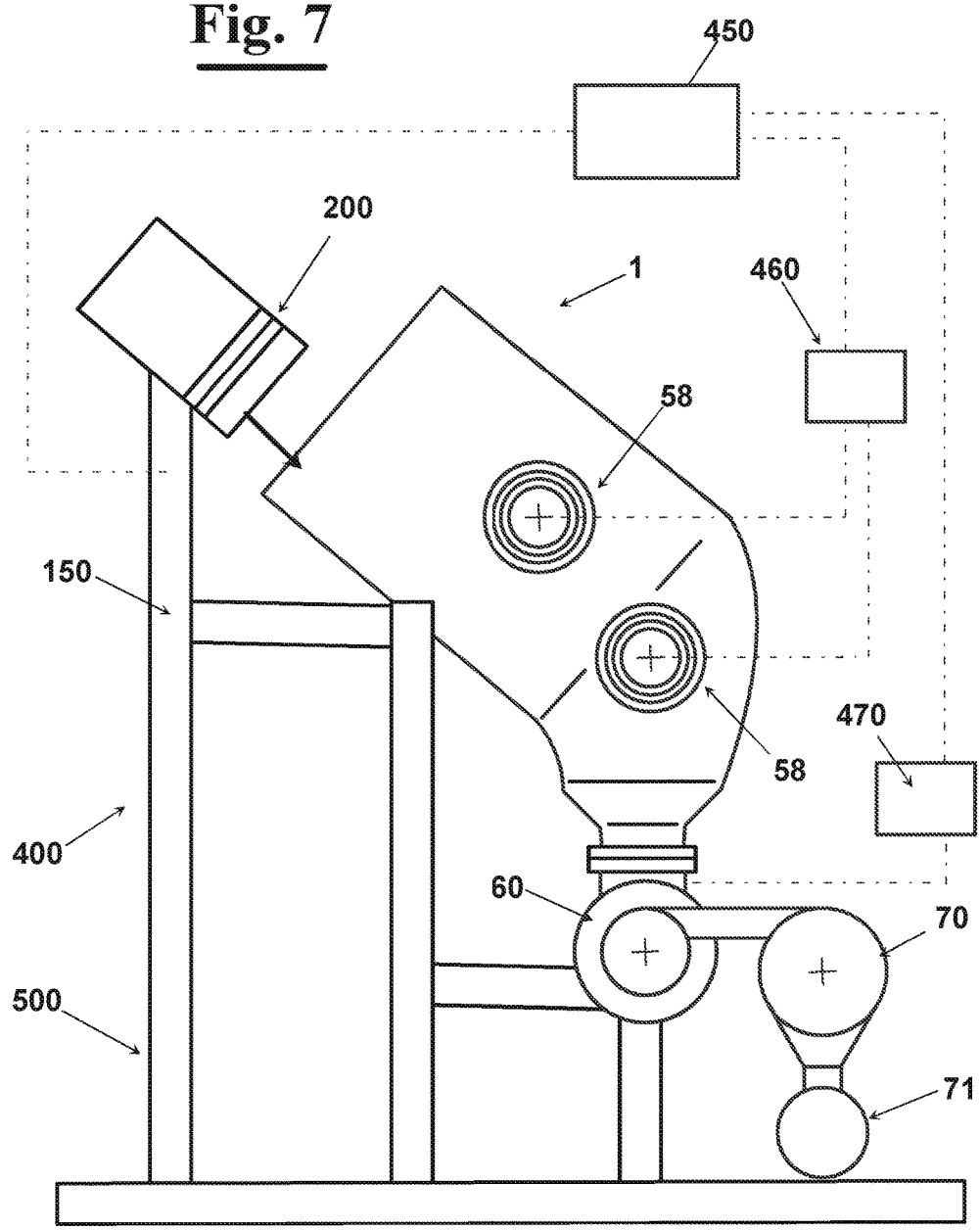
FIGS. 7 and 8A diagrammatically show an apparatus for making puree, or juice, from a frozen products in blocks, or in IQF form, respectively an elevational side view and an elevational front view.

In FIGS. 7 and 8 an apparatus is diagrammatically shown 400 for making puree, or juice, from a food product that is frozen in blocks, or in IQF form. Apparatus 400 comprises a crushing machine 1, as described above and shown in FIGS. 1 to 6. Apparatus 400 also comprises a feeding device 150 arranged to feed frozen product 100 in blocks, or in IQF form, to crush machine 1.

Apparatus 400 is then equipped with an adjustment member 450 arranged to operate feeding device 150 responsive to the amount of product 100 present in crushing machine 1 and/or to the amount of product 100 discharged from crushing machine 1. This way, it is possible to adjust the flowrate of frozen crushed product at the outlet of crushing machine 1.

More in detail, a measuring device 460 is provided that is configured to measure the amount of product present in the crushing chamber and to send a measurement signal to said adjustment member 450. In addition, or alternatively to measuring device 460, a flow meter 470 is provided that is configured to measure the flow of frozen crushed product discharged from crushing machine 1 and to send a flow signal to the adjustment member 450.

In particular, if the frozen treated product 100 is frozen in blocks, measuring device 460 is configured to measure the electric power adsorbed by the motors 58 that operate the rotation of the crushing rollers 55. Therefore, the adjustment member 450 is configured to operate feeding device 150 responsive to the signals of electric power adsorbed. In particular, the signal of electric power adsorbed by the motors 58 that operate the crushing rollers 55 is proportional to the amount of frozen product 100 present in the crushing machine. In fact, the more frozen product 100 is present in crushing machine 1 the higher is the electric power that is adsorbed by the motors 58, i.e. the electric power necessary to cause the rotation of the crushing rollers 55 about the respective rotation axes during the crushing steps of frozen product 100.

In particular, the working principle can be the following: when all the rollers absorb full power, then crushing machine 1, or "cruncher", is "full" of product, and when gradually each roller 55 decreases the absorption of power it means that the frozen product does not fully "engage" any more the rollers. And when the last roller 55 does not absorb power any more, it means that the cruncher is empty. Such indications provide a useful feedback to program the tilter for ensuring always a desired and programmed flowrate.

Flow meter 470, which measures the flow of frozen product 100 discharged from crushing machine 1, is configured to measure the flow rate at distribution valve 40 and to send a corresponding signal to adjustment member 450.

In case of frozen product in blocks, or in IQF form, feeding device 150 can be a discontinuous feeding device, for example a tilter of blocks 200 of frozen product, or in IQF form, arranged to feed at predetermined times a predetermined amount of frozen product in the crushing chamber.

Alternatively, feeding device 150 of the food product 100 can be arranged to feed the food product continuously to crush machine 1, for example a conveyor belt, or a screw conveyor, or other similar devices.

Figure 8A:
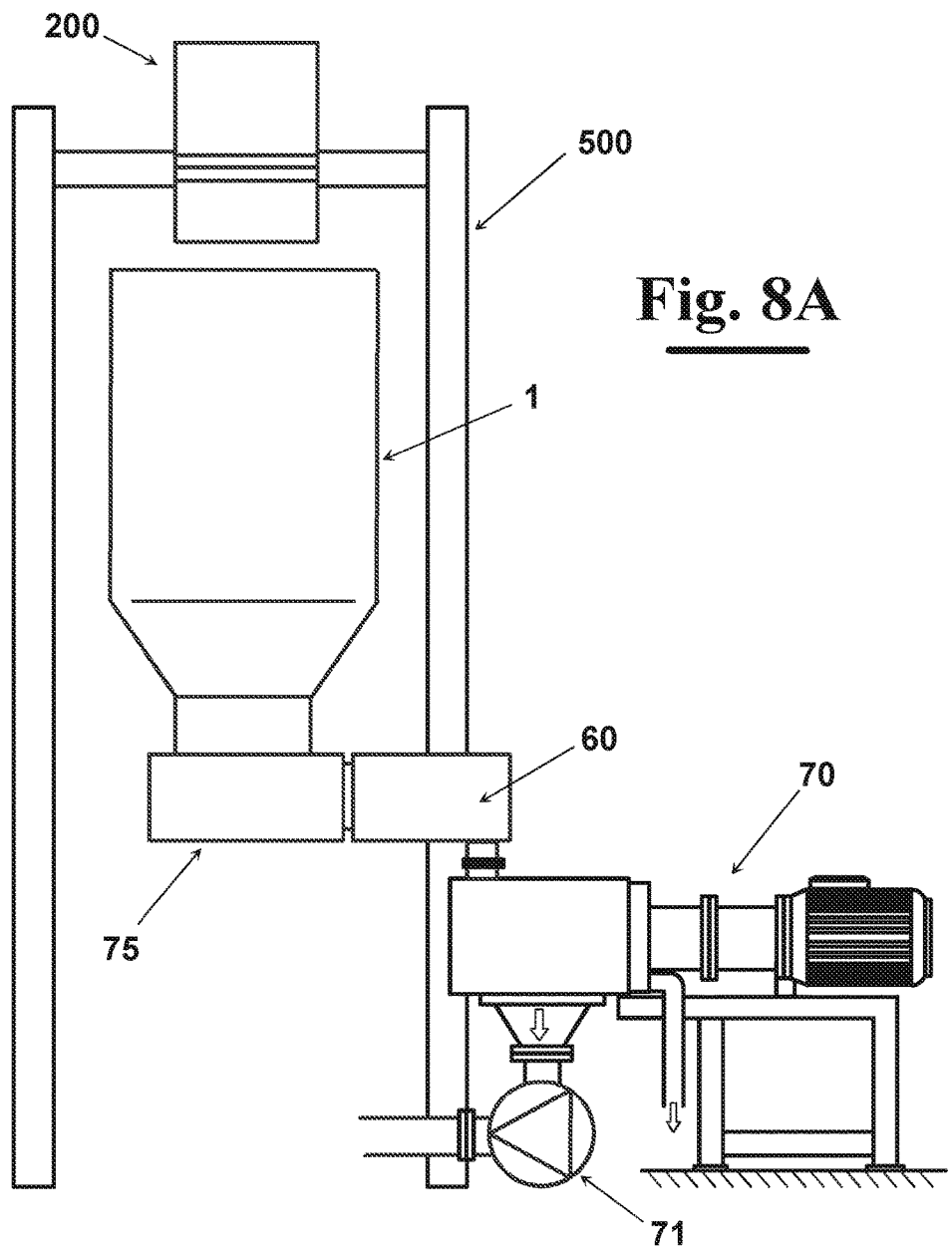
Figure 8B:
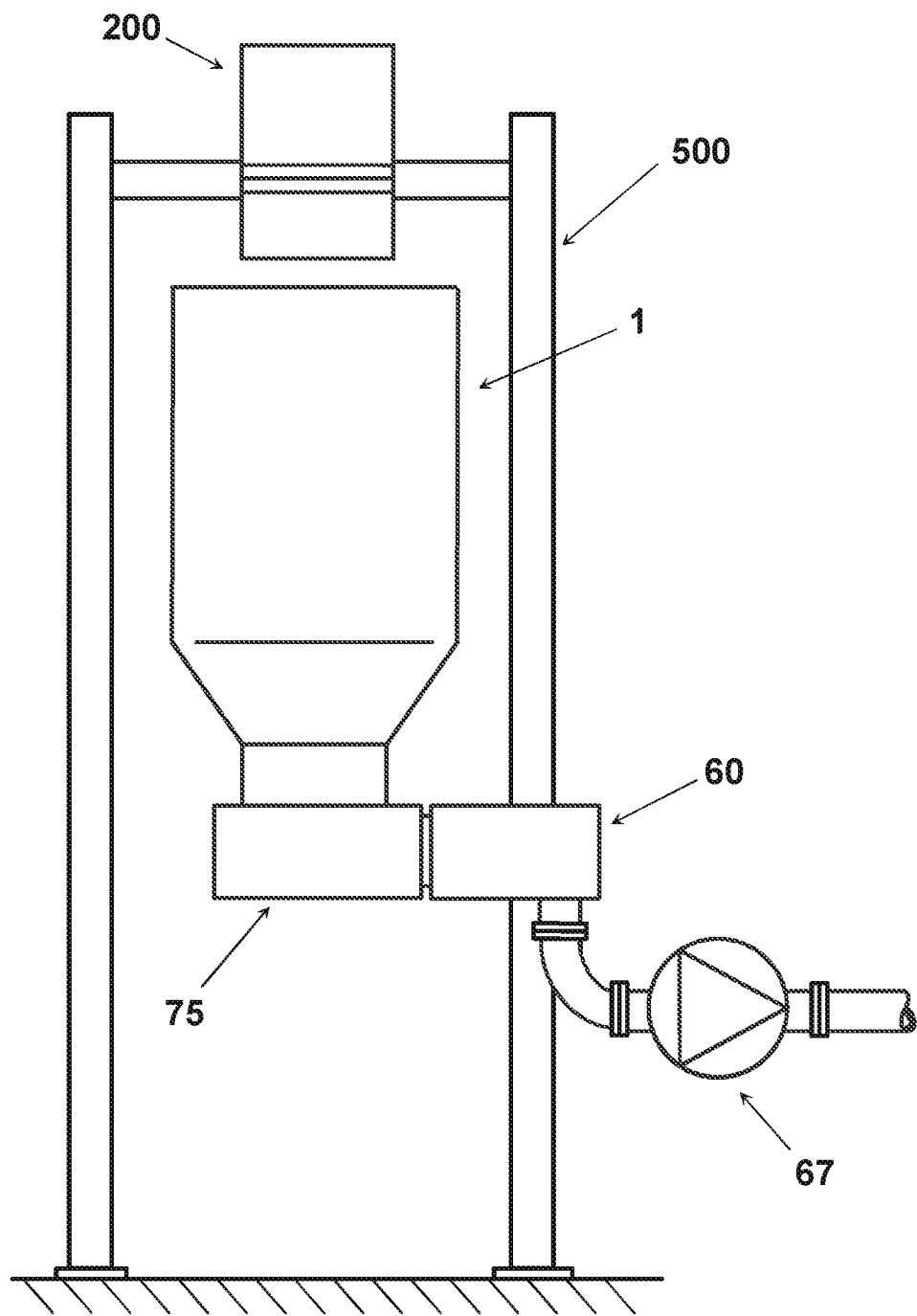
Figure 8E:
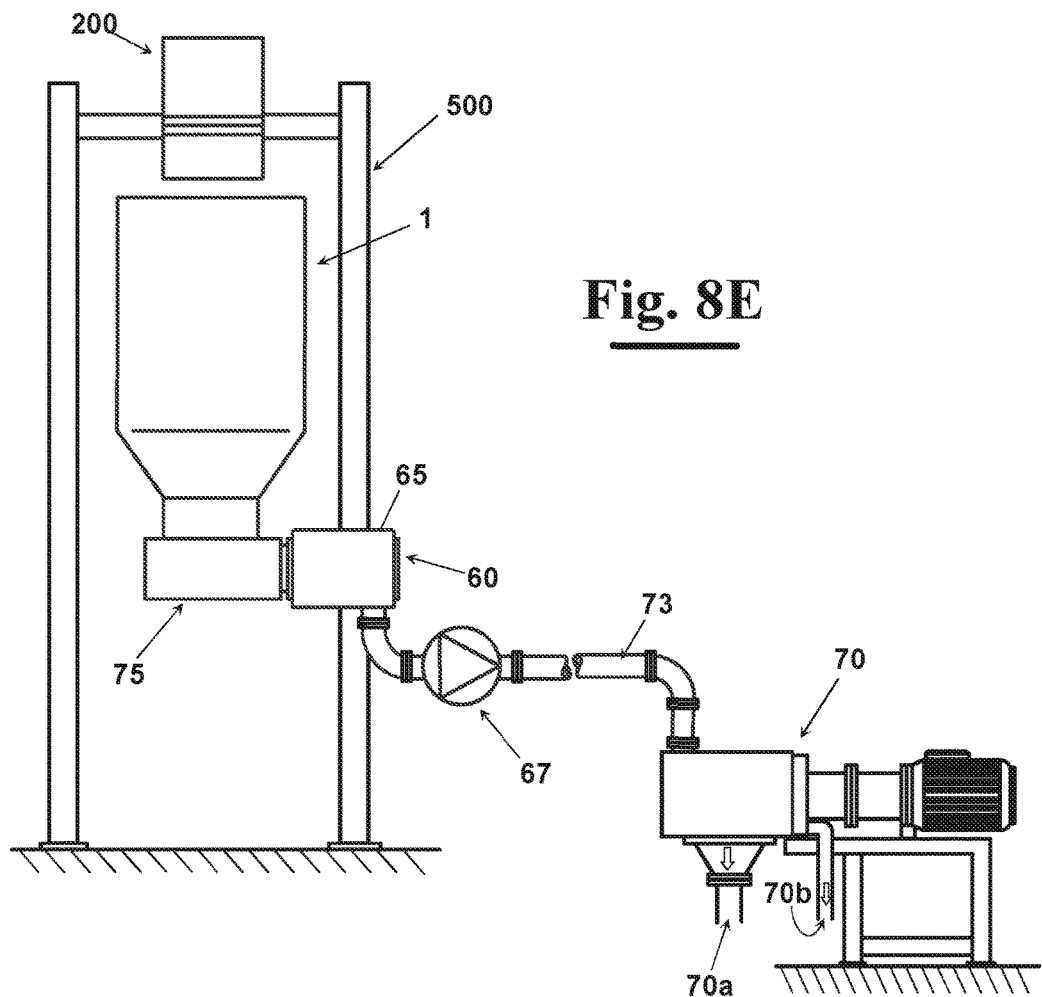

As shown in FIGS. 7 to 8E, downstream of crushing machine 1 a treating machine 60 can be provided, arranged to fluidify the product discharged from crushing machine 1 through outlet port 12.

In an exemplary embodiment of the invention, treating machine 60 is a softener in which the discharged product is fed by a pushing device 75, for example a screw conveyor. As described in detail in IT1249363, in the softener the product receives a plurality of pulses in quick succession obtained by the combined action of a stator 63 and of a rotor 64 arranged inside to rotate about a rotation axis. More in detail, rotor 64 pushes by centrifugal force the product against the surface 63a of stator 63.

In an exemplary embodiment treating machine 60 can be associated with a heating device 65, arranged to provide thermal power necessary to assist the treated product to turn, in combination with the above described pulses, from a substantially solid status to a substantially liquid status.

As diagrammatically shown in FIG. 8D, the heating device 65 can be a heating jacket mounted out of treating machine 60 in which vapor is present at a predetermined pressure. An example of this type of machine is disclosed in WO2009/063309.

Downstream of treating machine 60 a pump 67 can be provided, in particular a positive displacement pump, such as a lobe pump, arranged to transfer the treated product in the fluid state, for example to a further treating machine, or to a storage reservoir. In particular, the fluid product, substantially liquid, has the advantage to be transferred in an easily adjustable way to another area of the production plant. In particular, the fact that the product is fluidified remarkably assists the control and the adjustment of the flow and, accordingly, ensures to convey a precise amount of product to the machine, or to the reservoirs, to which it is destined.

Outlet port 12 of crushing machine 1 can be directly connected to a pushing device 75, for example a screw conveyor operated by a motor 76, arranged to feed the frozen crushed product exiting from crushing machine 1 to the above described treating machine 60 that fluidifies the frozen crushed product. In a further exemplary embodiment not shown in the figure, downstream of extracting machine 70 a further treating machine can be provided, for example an additional softener.

As diagrammatically shown in the exemplary embodiments of FIGS. 8A and 8E, apparatus 400 can also comprise an extracting machine 70. As well known, it provides a fixed sieve having a plurality of holes in which a rotor is mounted arranged to rotate about a rotation axis. The rotor has a plurality of blades configured to force an input product against the sieve, in order to separate the input product into a main product comprising the puree, or juice, which crosses the sieve and is discharged through a first outlet 70a, and into a waste material that, instead, cannot cross the sieve and is discharged through a second outlet 70b. An example of this extracting machine 70 is disclosed in detail in IT1199392 in the name of the same applicant.

In the exemplary embodiment of FIG. 8A extracting machine 70 is connected directly to the treating machine 60. In this case the treated product is discharged by gravity from treating machine 60 and fed into extracting machine 70. Instead, in the exemplary embodiment of FIG. 8E, between treating machine 60 and extracting machine 70 a pump is provided 67, in particular a positive displacement pump, such as a lobe pump. In this case, it is pump 67 that delivers the fluid product to the cold extractor 70 that determines the above described separation into a main product and into a waste material.

In view of the above, apparatus 400 of FIGS. 8B and 8C is an apparatus for fluidifying a product of vegetable origin frozen in blocks, or in IQF form.

As shown in FIGS. from 7 to 8E, each different exemplary embodiment of the above described apparatus 400 can be installed on an frame 500, in order to provide easily and in a predetermined way, an unit with predetermined size, in particular obtaining a modular portion that can be easily installed in a preexisting plant.

Figure 3C:
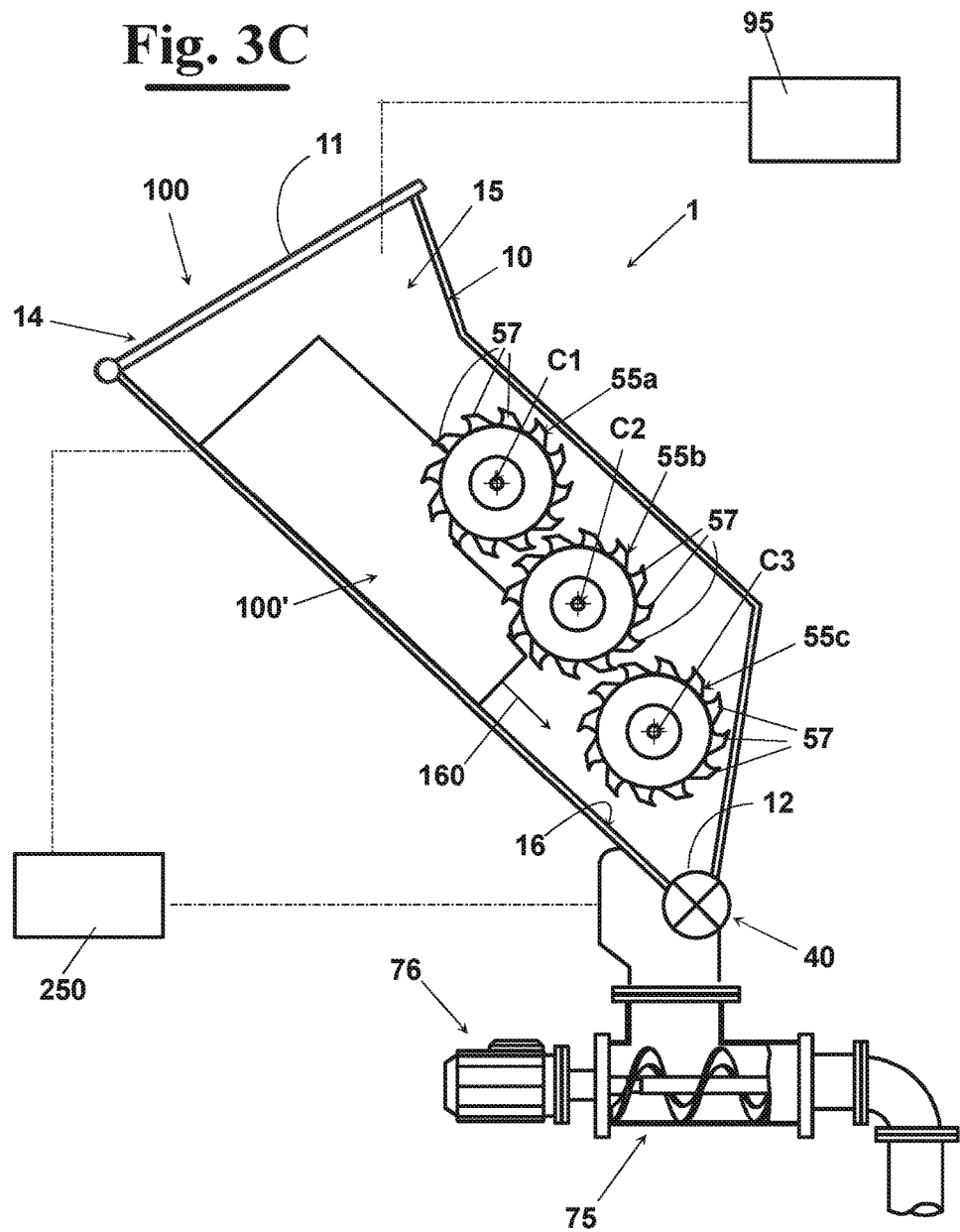

In the FIGS. 2B, 3B and 3C an exemplary embodiment is diagrammatically shown of the invention in which a cover 14 is associated with inlet port 11 of crushing machine 1. Cover 14 is configured to pass from an open position, in which it allows the access to inlet port 11 and then allows the introduction of the product 100 in crushing chamber 15, to a closed position, in which cover 14 blocks inlet port 11. More in detail, as diagrammatically shown in FIG. 2B, between cover 14 and a boundary edge 13 of inlet port 11 elements 18 are provided sealing, in order to insulate pneumatically crushing chamber 15 from the outer environment when cover 14 is arranged in the closed position. Crushing machine 1 is also equipped with an adjustment member 350 arranged to adjust the pressure in crushing chamber 15, i.e. normally it is possible to bring working machine 1 in conditions of controlled pressure. More in detail, the adjustment member 350 is adapted to keep a predetermined void ratio, or a predetermined pressure higher than atmospheric pressure in crushing chamber 15.

In a preferred configuration, also distribution valve 40 and each dividing movable wall 44, which can be provided, is associated with sealing elements, not shown in the figure, and configured to allow the movement into the working position and to ensure at the same time to keep pneumatically insulated crushing chamber 15 from the outer environment.

This exemplary embodiment allows working in conditions of controlled pressure in machine 1. More in detail, once loaded the product 100 in crushing chamber 15, with cover in the open position, in crushing chamber 15 a predetermined void ratio is chosen, or a predetermined pressure p higher than the atmospheric pressure, with cover 14 arranged in the closed position. This way, it is possible to improve the quality of the product to crush because the product 100 is exposed to the oxygen contained in the air. In fact, it is avoided that, during the crushing step, the product 100 can be oxidized, in particular in case of products that are particularly critical, such as peaches and apricots.

The process can be further improved supplying vapor in crushing chamber 15. Such solution adjusts the defrosting speed of frozen product 100 in IQF form, or in blocks, and assists therefore the crushing step thereof.

Figure 9:
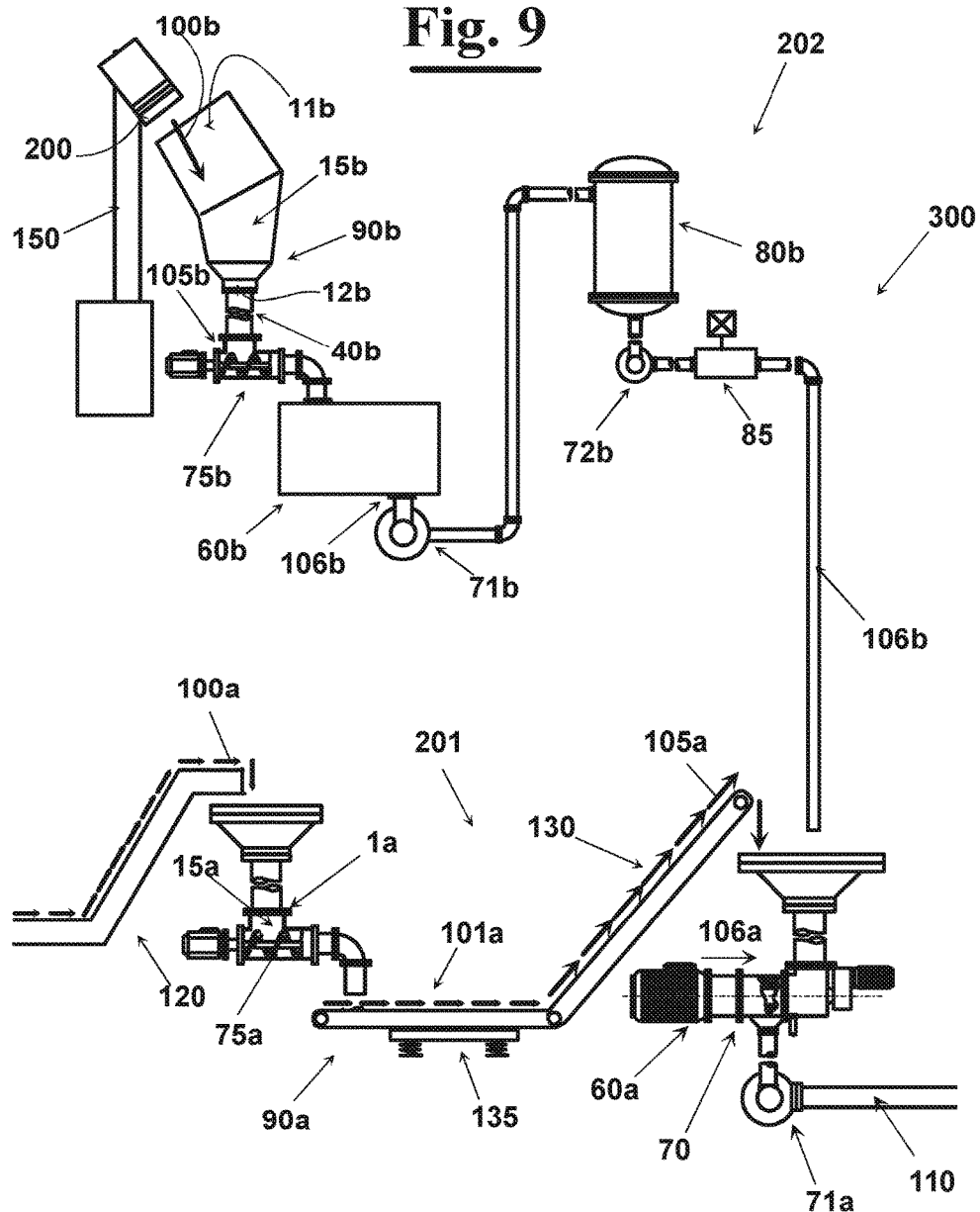
FIGS. 9 and 10 diagrammatically show two possible implants, according to the invention, to obtain a mixture of different food products having a crushing machine according to the invention.
Figure 10:
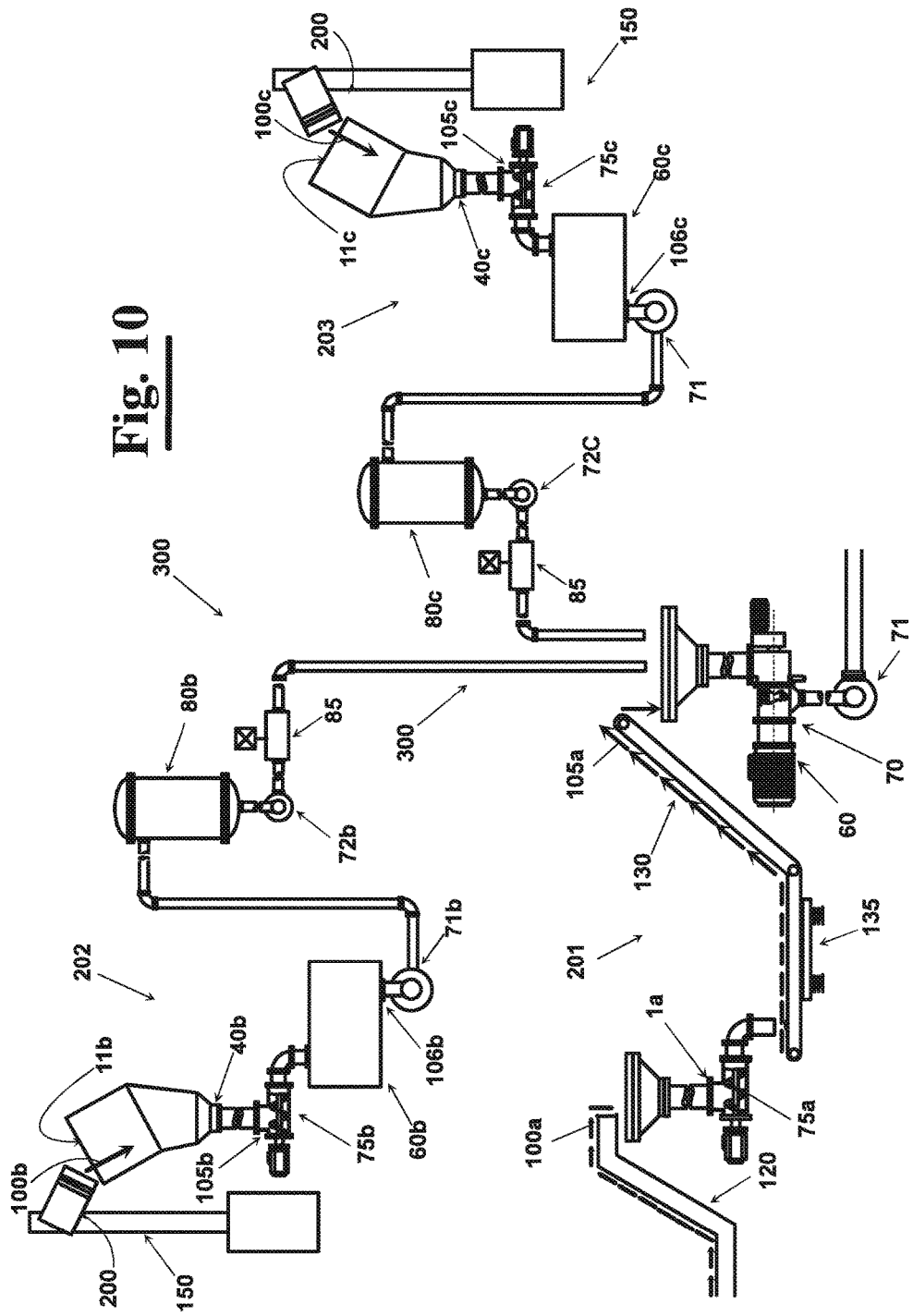

In FIGS. 9 to 11, a plant 300 is diagrammatically shown for making a mixture 110 of puree, or juice, of at least one first product 100a and a second product 100b of vegetable origin, according to a predetermined recipe. Plant 300 comprises a first processing line 201 for treating the first food product 100a, and a second processing line 202, for treating the second product 100b. More in detail, each processing line 201, 202 has a respective crushing machine 1a and 1b arranged to divide the treated food product 100a, 100b into fragments 105a, 105b of predetermined size. In the example of FIG. 9, first processing line 201 is configured for processing a food fresh product 100a. Therefore, crushing machine 1a, to which the product 100a can be fed for example by a conveyor belt 120, can simply comprise a cutter, for example of the type described in WO2013/105016 in the name of the same applicant.

The product fragments 101a, of a size usually set between 50 and 130 mm, at the outlet of crushing chamber 15a are transferred by a screw conveyor 75a onto a second conveyor belt 130 to which a weighing device is associated, for example at least one load cell 135. This way, a flow of product in fragments 105a that move along processing line 201 is determined, and it is possible, therefore, to provide a metered supply of the same. Then, the product fragments 105a are fed to a softening machine 60a. Softening machine 60a is arranged to soften the product obtaining a softened product through a quick succession of pulses, for example of the type described in IT1249363. Downstream of the treating machine 60, a cold extraction machine is provided 70 that operates in a known way, for example as described in IT1199392, but not shown in detail in the figures.

Advantageously, a rotor is provided that operates in combination with a sieve having a plurality of holes, in order to separate the product, in particular a softened product, or chopped, into a main product comprising the puree, or the juice, which crosses the sieve and is discharged through a first outlet and a waste material that, instead, cannot cross the sieve and is discharged through a second outlet. The treating machine, for example a system formed by softening machine 60 and extraction machine 70 can be combined in a single machine, as shown in FIG. 9, or can be arranged as two distinct machines.

Still with reference to FIG. 9, second processing line 202 of plant 300 is configured to treat a product 100b frozen in blocks, or IQF form, that is fed to crush machine 1b by an elevator 150 that causes the blocks usually weighing 200 kg, to be raised from a height q1 to a height q2>q1, where an inlet port 11b is present. Machine 1b is of the type above described with reference to FIGS. 1 to 6 and, accordingly, is configured to process both a product that is frozen in blocks, and in IQF form. Therefore, at the outlet of crushing machine 1b a crushed product 105b is discharged. At outlet port 12b of machine 1b a distribution valve is provided 40b.

The frozen crushed product 105b can be discharged directly into a screw conveyor 75b arranged below machine 1b. The screw conveyor 75b provides then to send the product 105b to a treating machine 60b, for example a softening machine, arranged to "fluidify" the frozen product, i.e. to turn it substantially into a fluid mass in such a way that it can be conveyable in ducts and pumps. This way, therefore, a fluidified product is obtained 106b that is sent by a pump 71b to a collection reservoir 80b. From reservoir 80b product 106b is discharged by means of a pump 72b. This is associated with a flow meter 85 that allows measuring and then adjusting the flow of product 106b to send to the extraction machine above described. This provides, therefore, mixing a predetermined amount of product 106a, obtained by first processing line 201, and of product 106b, i.e. obtained by second processing line 202, such that a predetermined mixture of product 110 is obtained corresponding to a predetermined recipe, for example 70% oranges and 30% apples.

One of the main advantages of plant 300 is avoiding the use of conveyor belts for transferring the product from crushing machine 1b to the machines downstream of it. This is possible thanks to the technical features of crushing machine 1b, as above described. Another relevant advantage of plant 300 is adjusting in a precise way the amount of product 106b, by flow meter 85, and then providing a mixture 110 corresponding to the requirements of the producer.

The softening machine 60b and the extraction machine can be, for example, of the type described in WO2009/063309.

In the exemplary embodiment of FIG. 10, plant 300 in addition to processing lines 201 and 202, a third processing line 203 is arranged to treat frozen product in IQF form. Processing line 203 is substantially the same as processing line 202 above described, but crushing machine 1c is simplified with respect to crush machine 1b. More in detail, since machine 1c cannot treat frozen products of different type, life products frozen in blocks and in IQF form, but only the latter type of frozen product, machine 1c can be equipped with a predetermined number of rollers, for example two rollers 55'a and 55'b, arranged at different positions in crushing chamber 15c.

Also machine 1c is preferably associated with a distribution valve 40c is arranged to periodically discharge a predetermined amount of frozen chopped product by machine 1c.

Notwithstanding in FIG. 9 an example is given of a plant where two processing lines 201 and 202 are provided, configured to treat respectively a fresh product and a product that is frozen in blocks, or in IQF form, it is also possible that one processing line is configured to treat a product that is frozen in blocks, or in IQF form, and then it provides also a crushing machine, as above described with reference to FIGS. 1 to 6, whereas the other processing line is configured to treat frozen products in IQF form, and then it provides a crushing machine as above described with reference to FIG. 11. In a further exemplary embodiment, plant 300 comprises two processing lines, both like reference 202 as described in FIG. 9.

It is not excluded, however, the possibility of having normally more than three processing lines, where at least one is of the type 202 above described with reference to FIG. 9.

The foregoing description of specific exemplary embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realize the different functions described herein could have a different nature without, for this reason, departing from the field of the invention. It is to be understood that the phraseology or terminology that is employed herein is for the purpose of description and not of limitation.

The invention claimed is:

1. A plant for making a mixture of puree, or juice, of at least a first and a second vegetable food product to obtain a predetermined recipe, comprising:
   a first processing line arranged to treat a first food product of vegetable origin, along a first processing line comprising:
   a first crushing machine arranged to divide said first food product of vegetable origin into fragments of predetermined size, said first crushing machine equipped with an inlet port, through which said vegetable food product is put in a crushing chamber in which a crushing unit is arranged, and an outlet port through which said fragments of predetermined size are discharged from said crushing chamber;
   a first treatment section arranged to treat said fragments of predetermined size, obtaining a first treated product;
   a first feeding device arranged to feed said first food product in said crushing chamber of said first crushing machine;

a flow measurement section, for measuring the flow rate of said first vegetable food product conveyed along said first processing line of said product;

a second processing line of a second food product of vegetable origin, along said second processing line comprising:

a second crushing machine arranged to divide said second food product of vegetable origin into fragments of predetermined size, said second crushing machine equipped with an inlet port, through which said vegetable food product is put in a crushing chamber where a crushing unit is arranged, and an outlet port through which said fragments of predetermined size are discharged from said second crushing chamber;

a second feed device arranged to feed said second food product in said crushing chamber of said second crushing machine;

a second treatment section arranged to treat said fragments of predetermined size, obtaining a second treated product;

a second flow measurement section, for measuring the flow rate of said second food product of vegetable origin conveyed along said second processing line of said product;

an extraction section operatively connected to said first and to said second processing line, wherein said extraction section is configured to receive a predetermined relative quantity of said first treated product, and of said second treated product, and to determine a separation of a starting product into a main product containing puree, or juice, and into a waste material, said main product consisting of a mixture of said first and of said second treated product corresponding to a predetermined recipe;

and in that at least one among said first and said second flow measuring section is located upstream of the respective treatment section.

2. The plant according to claim 1, wherein at least one of the first crushing machine and the second crushing machine comprises:

a box-like body defining the crushing chamber, said box-like body comprising the inlet port, through which said frozen food product is put in the crushing chamber;

a crushing unit mounted in said crushing chamber, said crushing unit comprising a plurality of crushing rollers, each of which is arranged to rotate about a respective rotation axis, and having, peripherally, a plurality of teeth arranged to cut said product frozen in blocks, or IQF form, for splitting it into said fragments of predetermined size;

a distribution valve associated with said outlet port, said distribution valve arranged to adjust the amount of crushed product discharged from said machine through said outlet port;

wherein a selection means is provided which is adapted to select a working configuration chosen among: a first configuration, wherein said machine is configured to treat said frozen product in blocks and a second configuration, wherein said machine is configured to treat said frozen product in IQF form.

3. The plant according to claim 2, wherein said distribution valve has a main body and a movable part which can move with respect to said main body, said movable part equipped with a recessed portion arranged to alternate between a loading position, in which said recessed portion is oriented towards said crushing chamber and the fragments of frozen product are kept inside, and an unloading position, in which said recessed portion is oriented towards an outlet of said main body and said fragments are discharged from said recessed portion and sent downstream of said distribution valve.

4. The plant according to claim 3, wherein said movable part of said distribution valve is configured to pass from said loading position to said unloading position through a rotation about a rotation axis.

5. The plant according to claim 3, wherein said distribution valve has a plurality of recessed portions arranged to be selectively located between said loading position and said unloading position.

6. The plant according to claim 2, wherein said plurality of crushing rollers comprises:

a first crushing roller having, peripherally, a plurality of teeth arranged to cut said block of frozen product; and at least a second crushing roller that is located downstream of said first crushing roller in the conveying direction of the frozen product in said machine, said second crushing roller also having, peripherally, a plurality of teeth.

7. The plant according to claim 6, wherein said first and said second crushing rollers are configured in such a way that said teeth of said crushing roller that is located downstream, protrude beyond said teeth of said crushing roller that is located upstream, in a direction substantially orthogonal to the conveying direction of said frozen product along said crushing machine, wherein said first and said second crushing rollers are arranged close to the wall of the machine along which the treated product slides, said rotation axis of said crushing roller arranged above a plane defined by the axis of said first roller and by the conveying direction of the product in the machine.

8. The plant according to claim 6, wherein said teeth of each roller are curved and arranged to be oriented towards said frozen product in movement along said machine, in order to have an ideal fastening angle of said teeth for increasing the capacity of penetrating the frozen product.

9. The plant according to claim 2, wherein, at a slide wall for the product, at the wall along which the frozen product can slide in the crushing chamber, at least one movable wall is provided, and an operation unit is provided arranged to move said, or each, movable wall in a position having a predetermined inclination with respect to said slide wall.

10. The plant according to claim 2, wherein the first crushing machine further comprises:

a cover associated with said inlet port, said cover arranged to pass from an open position, in which said cover allows the access to said inlet port and then the introduction of said product in said crushing chamber, to a closed position, in which said cover blocks said inlet port;

sealing elements located between said cover and a boundary edge of said inlet port, said sealing elements arranged to insulate, pneumatically, said crushing chamber from the outer environment when said cover is in said closed position; and an adjustment member arranged to adjust the pressure in said crushing chamber, said adjustment member arranged to keep a predetermined void ratio, or a predetermined pressure higher than atmospheric pressure in said crushing chamber.

11. An apparatus for making puree, or juice, from a food product frozen in blocks, or in IQF form, the apparatus comprising:

a box-like body defining a crushing chamber, said box-like body having an inlet port, through which said frozen food product is put in the crushing chamber, and an outlet port through which a crushed product is discharged from said crushing chamber;

a crushing unit mounted in said crushing chamber, said crushing unit comprising a plurality of crushing rollers each of which arranged to rotate about a respective rotation axis and having, peripherally, a plurality of teeth arranged to cut said product frozen in blocks, or IQF form, for splitting said product frozen in blocks into fragments of predetermined size;

a distribution valve associated with said outlet port, said distribution valve arranged to adjust the amount of crushed product discharged from said machine through said outlet port;

wherein a selection means is provided which is adapted to select a working configuration chosen among: a first configuration, where said machine is configured to treat said frozen product in blocks, and a second configuration, where said machine is configured to treat said frozen product in IQF form;

a feeding device arranged to feed said frozen product in blocks, or in IQF form, to said crushing machine;

an adjustment member arranged to operate said feeding device responsive to the amount of product present in said crushing machine and/or the amount of product discharged from said crushing machine, in order to have an adjustment of the flowrate of frozen crushed product at the outlet of the crushing machine;

a measuring device configured to measure the amount of product present in the crushing chamber and to send a measurement signal to said adjustment member; and/or a flow measuring device configured to measure the flow of frozen crushed product discharged from the crushing machine and to send a flow signal to said adjustment member.

12. The apparatus according to claim 11, wherein said frozen product is a product that is frozen in blocks and said measuring device is configured to measure the electric power adsorbed by the motors arranged to operate the rotation of the crushing rollers, said adjustment member arranged to operate said feeding device responsive to said signal of electric power adsorbed.

13. The apparatus according to claim 12, wherein said measuring device of said flow of frozen crushed product discharged from said crushing machine is configured to measure the speed of said distribution valve and to send a corresponding flow signal to said adjustment member.

14. An apparatus for fluidifying a product of vegetable origin frozen in blocks, or in IQF form, the apparatus comprising:

a crushing machine comprising:
   a box-like body defining a crushing chamber, said box-like body having an inlet port, through which said frozen food product is put in the crushing chamber and an outlet port through which a crushed product is discharged from said crushing chamber;

a crushing unit mounted in said crushing chamber, said crushing unit comprising a plurality of crushing rollers each of which arranged to rotate about a respective rotation axis and having, peripherally, a plurality of teeth arranged to cut said product frozen in blocks, or IQF form, for splitting said product frozen in blocks into fragments of predetermined size;

a distribution valve associated with said outlet port, said distribution valve arranged to adjust the amount of crushed product discharged from said machine through said outlet port;

wherein a selection means is provided which is adapted to select a working configuration chosen among: a first configuration, where said machine is configured to treat said frozen product in blocks, and a second configuration, where said machine is configured to treat said frozen product in IQF form;

a cover associated with said inlet port, said cover arranged to pass from an open position, in which said cover allows access to said inlet port and then the introduction of said product in said crushing chamber, to a closed position, in which said cover blocks said inlet port;

sealing elements located between said cover and a boundary edge of said inlet port, said sealing elements arranged to insulate, pneumatically, said crushing chamber from the outer environment when said cover is in said closed position; and an adjustment member arranged to adjust the pressure in said crushing chamber, said adjustment member arranged to keep a predetermined void ratio, or a predetermined pressure higher than atmospheric pressure in said crushing chamber; and a treating machine that is located downstream of said crushing machine, said treating machine arranged to fluidify a product discharged from said crushing machine through said outlet port, in such a way that a fluidified product is transferred through pumps and ducts to another area.

15. The apparatus according to claim 14, wherein said treating machine is a softener arranged to soften said product discharged from said crushing machine by a quick succession of pulses transmitted by a combined action of a stator that has a surface having protrusions against which the product is pushed by the centrifugal action of a rotor that rotates in said stator.

16. The apparatus according to claim 14, wherein said treating machine is associated with a heating device arranged to provide to said treated product in said treating machine thermal power necessary to turn said product from a substantially solid status to a substantially liquid status.

17. The apparatus according to claim 14, wherein, downstream of said treating machine, a pump is provided arranged to transfer the product in the fluid state downstream of said treating machine.

* * * * *